US012670274B1

(12) United States Patent
Dayan et al.

(10) Patent No.: US 12,670,274 B1
(45) Date of Patent: Jun. 30, 2026

(54) DYNAMICALLY SECURING OPERATIONS IN AGENTIC ARTIFICIAL INTELLIGENCE MODELS

(71) Applicant: CyberArk Software Ltd., Petach-Tikva (IL)

(72) Inventors: Tomer Dayan, Rishon Lezion (IL); Gil Adda, Nordiya (IL); Yaron Nisimov, Kfar Saba (IL); Rafi Schwarz, Ramat Gan (IL); Ofir Iluz, Jerusalem (IL); Inbal Zilberman, Ganei Tikva (IL); Eran Koifman, Petach Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 19/421,537

(22) Filed: Dec. 16, 2025

(51) Int. Cl.
*G06F 21/62* (2013.01)
*G06F 21/53* (2013.01)

(52) U.S. Cl.
CPC .............. *G06F 21/62* (2013.01); *G06F 21/53* (2013.01); *G06F 2221/2101* (2013.01)

(58) Field of Classification Search
CPC ... G06F 21/62; G06F 21/53; G06F 2221/2101
See application file for complete search history.

(56) References Cited

U.S. PATENT DOCUMENTS

| | | | | |
|---|---|---|---|---|
| 11,282,142 B2 * | 3/2022 | Henderson | ............. | G06Q 40/06 |
| 2019/0356661 A1 * | 11/2019 | Hecht | ................... | H04L 9/0891 |
| 2021/0091995 A1 * | 3/2021 | Trim | .................... | H04L 9/0643 |
| 2022/0109675 A1 * | 4/2022 | Williams | ............. | H04L 63/062 |

OTHER PUBLICATIONS

Tomer Dayan, "Build Your Own Processors in NIFI", Retrieved From https://medium.com/@tomerdayan168/build-your-processors-in-nifi-7bb0f217ed75, Published Oct. 2, 2023 (Year: 2023).*

* cited by examiner

*Primary Examiner* — Chau Le

(74) *Attorney, Agent, or Firm* — Finnegan, Henderson, Farabow, Garrett & Dunner, LLP

(57) ABSTRACT

Disclosed embodiments relate to systems and methods for controlling access to a resource by an artificial intelligence orchestration system. Example techniques include receiving, at an authorization component integrated with the orchestration system, a request to perform an operation, the request being initiated by an autonomous component; deriving, from the request and data associated with an environmental state, information representing at least one of a purpose and a context of the operation; dynamically evaluating the information, to identify one or more least-privileged permissions required for the operation; issuing an authorization artifact that embeds an ephemeral permission set scoped to the least-privileged permissions; and enabling the operation to execute using only the ephemeral permission set.

23 Claims, 10 Drawing Sheets

100

120/130/140

110

300

400

312

410

420

440

430

Policy
- ☑ Privilege 1
- ☑ Privilege 2
- ☐ Privilege 3
- ☑ Privilege 4

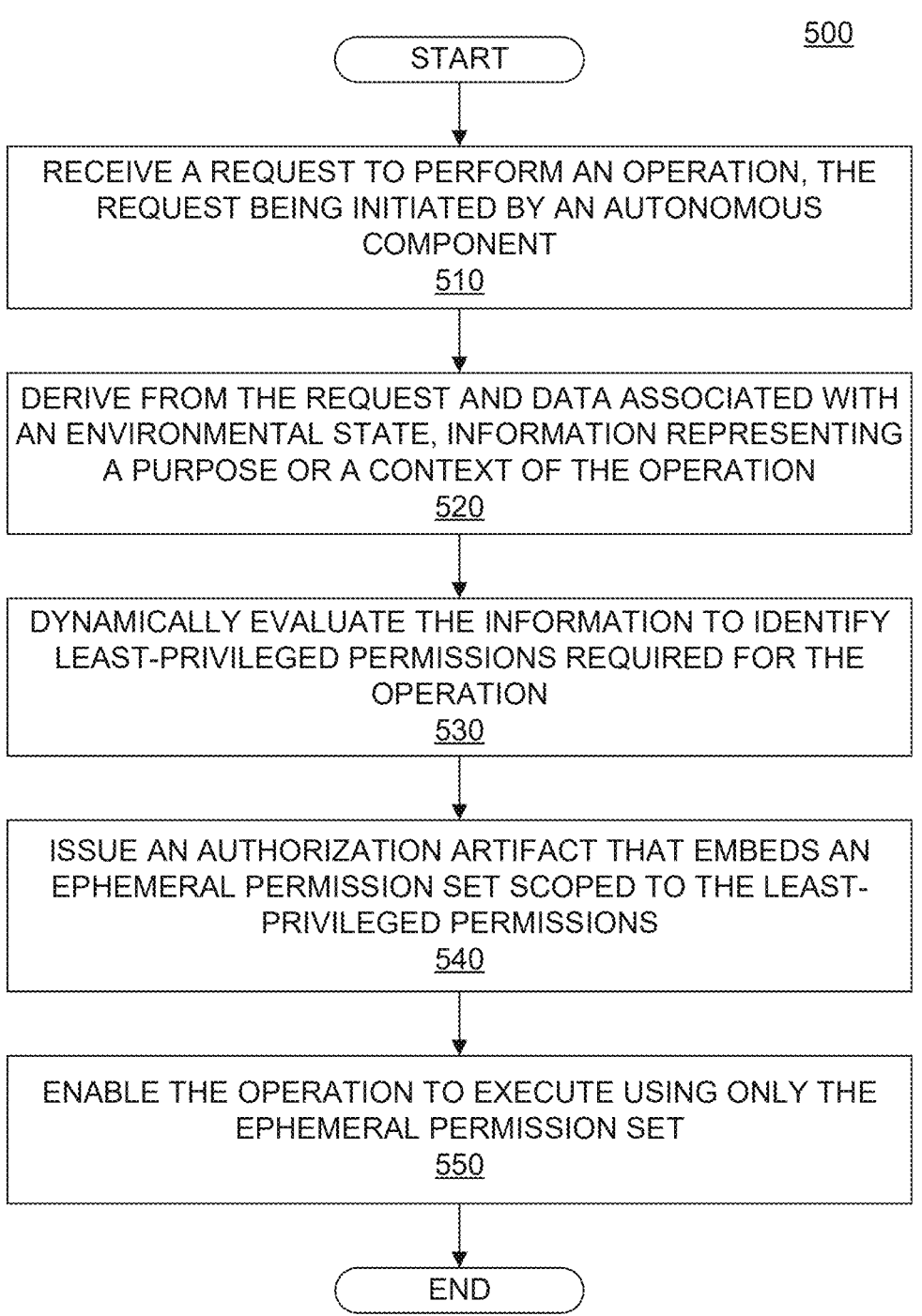

500

START

RECEIVE A REQUEST TO PERFORM AN OPERATION, THE REQUEST BEING INITIATED BY AN AUTONOMOUS COMPONENT
510

DERIVE FROM THE REQUEST AND DATA ASSOCIATED WITH AN ENVIRONMENTAL STATE, INFORMATION REPRESENTING A PURPOSE OR A CONTEXT OF THE OPERATION
520

DYNAMICALLY EVALUATE THE INFORMATION TO IDENTIFY LEAST-PRIVILEGED PERMISSIONS REQUIRED FOR THE OPERATION
530

ISSUE AN AUTHORIZATION ARTIFACT THAT EMBEDS AN EPHEMERAL PERMISSION SET SCOPED TO THE LEAST-PRIVILEGED PERMISSIONS
540

ENABLE THE OPERATION TO EXECUTE USING ONLY THE EPHEMERAL PERMISSION SET
550

END

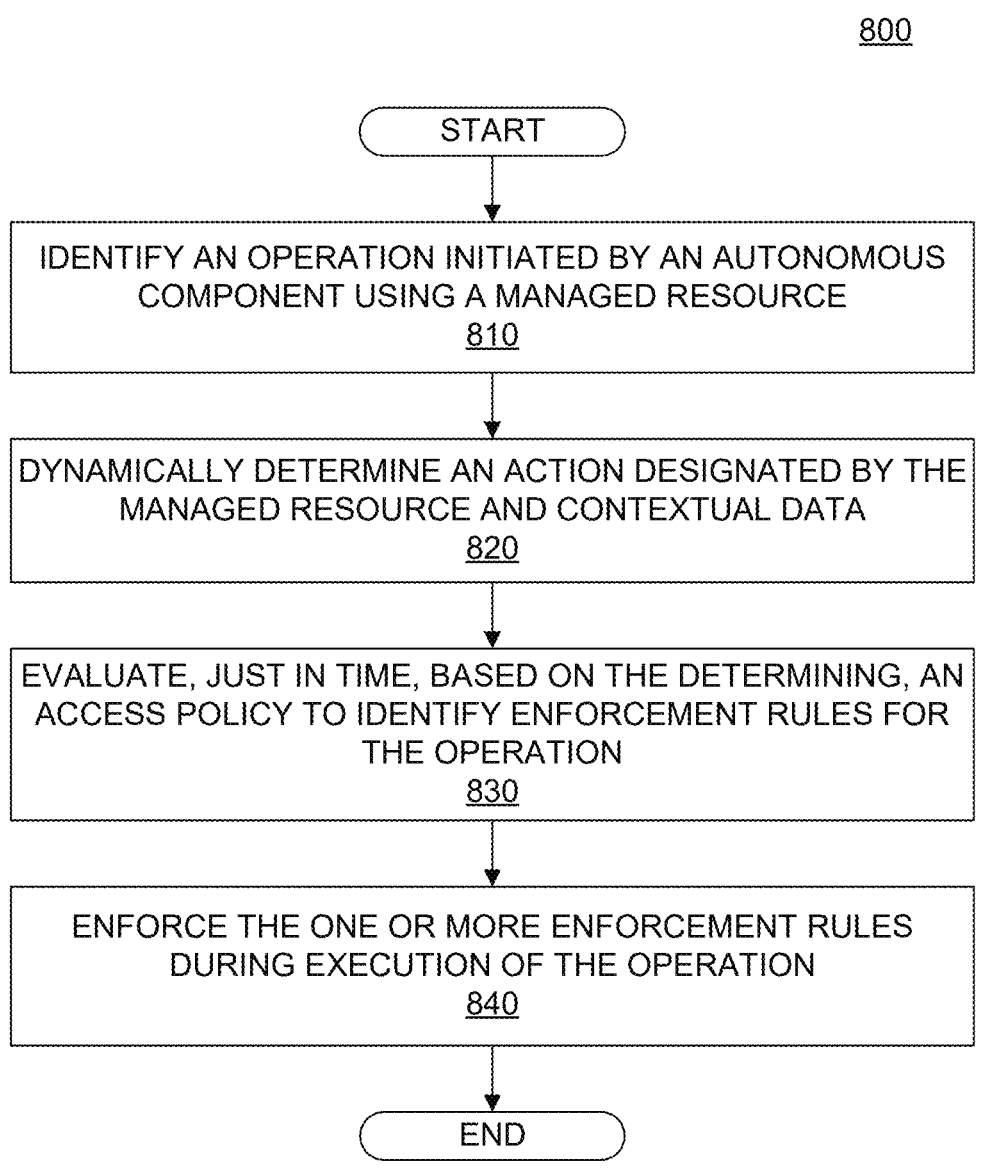

800

START

IDENTIFY AN OPERATION INITIATED BY AN AUTONOMOUS
COMPONENT USING A MANAGED RESOURCE
810

DYNAMICALLY DETERMINE AN ACTION DESIGNATED BY THE
MANAGED RESOURCE AND CONTEXTUAL DATA
820

EVALUATE, JUST IN TIME, BASED ON THE DETERMINING, AN
ACCESS POLICY TO IDENTIFY ENFORCEMENT RULES FOR
THE OPERATION
830

ENFORCE THE ONE OR MORE ENFORCEMENT RULES
DURING EXECUTION OF THE OPERATION
840

END

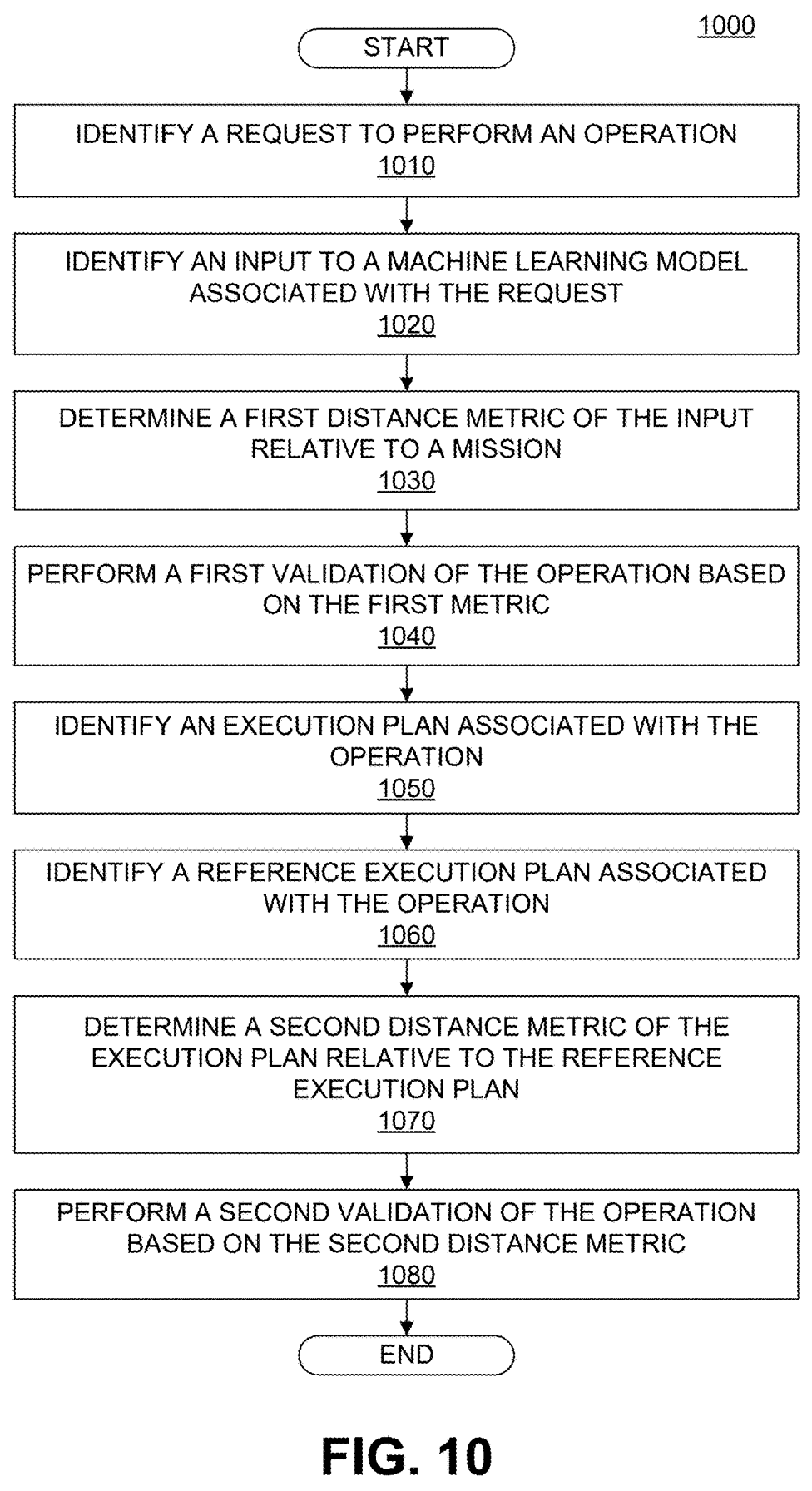

START

IDENTIFY A REQUEST TO PERFORM AN OPERATION
1010

IDENTIFY AN INPUT TO A MACHINE LEARNING MODEL
ASSOCIATED WITH THE REQUEST
1020

DETERMINE A FIRST DISTANCE METRIC OF THE INPUT
RELATIVE TO A MISSION
1030

PERFORM A FIRST VALIDATION OF THE OPERATION BASED
ON THE FIRST METRIC
1040

IDENTIFY AN EXECUTION PLAN ASSOCIATED WITH THE
OPERATION
1050

IDENTIFY A REFERENCE EXECUTION PLAN ASSOCIATED
WITH THE OPERATION
1060

DETERMINE A SECOND DISTANCE METRIC OF THE
EXECUTION PLAN RELATIVE TO THE REFERENCE
EXECUTION PLAN
1070

PERFORM A SECOND VALIDATION OF THE OPERATION
BASED ON THE SECOND DISTANCE METRIC
1080

END

FIG. 10

DYNAMICALLY SECURING OPERATIONS IN AGENTIC ARTIFICIAL INTELLIGENCE MODELS

BACKGROUND

Technical Field

The present disclosure relates generally to cybersecurity and, more specifically, to techniques for improving security in systems incorporating artificial intelligence models.

Background Information

Individuals and organizations are increasingly employing artificial intelligence models as tools for business as well as personal use. Large Language Models (LLMs), for example, are designed for natural language processing tasks such as language generation, among other tasks. Further, the development of agentic artificial intelligence (AI) systems marks a significant advancement beyond traditional LLMs. Such agentic AI systems may refer to models or architectures capable of autonomous decision-making, planning, and acting on behalf of users or organizations to accomplish complex goals. Unlike conventional LLMs that respond to individual prompts in isolation, agentic AI systems can interpret multi-step tasks, maintain context over extended interactions, and even proactively seek information or resources needed to fulfill their objectives. In many deployments, these systems leverage external Model Context Protocol (MCP) tools, through which the agent can invoke additional capabilities, data sources, or execute specialized operations.

This increased autonomy brings notable benefits, including improved efficiency, scalability, and personalized assistance. However, it also introduces new security challenges, as agentic AI systems possess greater control and may perform sensitive operations or access sensitive data. While this increased autonomy may offer significant advantages such as enhanced efficiency and scalability, it also presents new security challenges. For example, a malicious user interacting with the agent through the LLM or MCP client could manipulate prompts, issue harmful instructions, or misuse integrated tools to circumvent security mechanisms. Likewise, MCP tools invoked by the agent during execution may become points of vulnerability. If compromised or inadequately designed, these tools could leak sensitive information, perform unauthorized actions, or "poison" the agent's reasoning with false outputs.

Accordingly, in view of these and other deficiencies in current techniques, technical solutions are needed to provide more robust security controls within agentic AI systems. Such solutions should advantageously address both user-initiated and tool-based attack vectors, enabling fine-grained access management and real-time threat detection. Solutions should also incorporate mechanisms to continuously monitor agentic AI system activities, enforce least-privilege access controls, and promptly detect and respond to unauthorized or anomalous operations.

SUMMARY

The disclosed embodiments describe non-transitory computer readable media, systems, and methods for detecting and mitigating unwanted instructions in artificial intelligence models. For example, in an embodiment, a non-transitory computer readable medium may include instructions that, when executed by at least one processor, cause the at least one processor to perform operations for controlling access to a resource by an artificial intelligence orchestration system. The operations may comprise receiving, at an authorization component integrated with the orchestration system, a request to perform an operation, the request being initiated by an autonomous component; deriving, from the request and data associated with an environmental state, information representing at least one of a purpose and a context of the operation; dynamically evaluating the information to identify one or more least-privileged permissions required for the operation; issuing an authorization artifact that embeds an ephemeral permission set scoped to the least-privileged permissions; and enabling the operation to execute using the ephemeral permission set.

According to a disclosed embodiment, deriving the information representing the purpose may comprise applying at least one machine-learning model.

According to a disclosed embodiment, the context of the operation may comprise one or more attributes selected from: metadata associated with the autonomous component, an identity of a user associated with the autonomous component, a role of a user associated with the autonomous component, an identifier of a tool associated with the orchestration system, a model chain step, an identifier associated with a target resource, a data classification, a time, a location, a device posture, a historical operation, past operations performed by the autonomous components, past operations performed by an identity associated with a user associated with the autonomous components, and a workload attestation.

According to a disclosed embodiment, the authorization artifact may encode at least one of a time limit, a usage count, or a signature that binds at least one of a purpose, a scope, and an expiry.

According to a disclosed embodiment, evaluating the information may further comprise initiating a human approval workflow for an action.

According to a disclosed embodiment, causing the operation to execute may comprise constraining at least one of: a prompt scope, a target selection, or an environment configuration.

According to a disclosed embodiment, causing the operation to execute may comprise provisioning a temporary credential that embodies the ephemeral permission set.

According to a disclosed embodiment, the operations may further comprise invalidating the authorization artifact upon completion of the operation or upon satisfaction of a revocation condition.

According to a disclosed embodiment, invalidating the authorization artifact may comprise revoking a temporary credential and clearing secret material from memory.

According to a disclosed embodiment, the operations may further comprise recording one or more audit records associated with the operation.

According to a disclosed embodiment, recording the audit may comprise binding the operation to at least one of a workflow identifier or a step identifier, and the authorization component may operate as a proxy or wrapper for an agentic artificial intelligence tool framework.

According to a disclosed embodiment, the evaluating may further include analyzing one or more rules pre-defined by an entity associated with a customer.

According to a disclosed embodiment, evaluating the information may comprise utilizing a policy engine coupled to the orchestration system.

3

According to a disclosed embodiment, evaluating the information may comprise applying at least one machine-learning model.

According to a disclosed embodiment, the information may represent a context of the operation and deriving the information may comprise obtaining attributes selected from: a user identity, a user role, historical requests of the user, a running environment, an active task associated with the operation, a name and version of a tool associated with the orchestration system, document labels, a time, a geofence, a device posture, past operations performed by the autonomous component, past operations performed by an identity of a user associated with the autonomous components, and a workload attestation.

According to a disclosed embodiment, the authorization artifact may encode a purpose binding comprising at least one of: a workflow identifier, a step identifier, a data classification, or a requested scope, and wherein the evaluation requires the purpose to match a permitted value.

According to another disclosed embodiment, there may be a computer-implemented method for controlling access to a resource by an artificial intelligence orchestration system. The method may comprise receiving, at an authorization component integrated with the orchestration system, a request to perform an operation, the request being initiated by an autonomous component; deriving, from the request and data associated with an environmental state, information representing at least one of a purpose and a context of the operation; dynamically evaluating the information, to identify one or more least-privileged permissions required for the operation; issuing an authorization artifact that embeds an ephemeral permission set scoped to the least-privileged permissions; and causing the operation to execute using the ephemeral permission set.

According to a disclosed embodiment, at least one of deriving the information or dynamically evaluating the information may comprise applying at least one machine-learning model.

According to a disclosed embodiment, the model may incorporate historical interaction data associated with an initiator of the operation.

According to a disclosed embodiment, the authorization artifact may further embed at least one of an indication of the request to perform an operation or a sequence of actions associated with causing the operation to execute.

According to another disclosed embodiment, a non-transitory computer readable medium may include instructions that, when executed by at least one processor, cause the at least one processor to perform operations for controlling access to a resource by an artificial intelligence orchestration system. The operations may comprise receiving, at an authorization component integrated with the orchestration system, a request to perform an operation, the request being initiated by an autonomous component; deriving, from the request and data associated with an environmental state, information representing at least one of a purpose and a context of the operation; dynamically evaluating the information, to identify one or more parameters for adapting the operation; modifying the request based on the parameters to generate a modified request; and causing the operation to execute the modified request.

According to another disclosed embodiment, there may be a computer-implemented method for runtime, context-aware per-operation enforcement in a managed resource. The method may comprise identifying, by a runtime enforcement component coupled to the managed resource, an operation initiated by an autonomous component using the managed resource; dynamically determining one or more actions designated by the managed resource and contextual data, wherein the designated action and the contextual data are associated with the operation; evaluating, just in time, based on the determining, one or more access policies to identify one or more enforcement rules for the operation; and enforcing, during execution of the operation, the one or more enforcement rules.

According to a disclosed embodiment, determining the one or more actions may be based on analyzing the operation.

According to a disclosed embodiment, the runtime enforcement component may comprise a user-space interceptor and an operating system control configured to mediate one or more system calls.

According to a disclosed embodiment, mediating the one or more system calls may comprise filtering the system calls based on at least one action selected from: open, connect, clone, unshare, mount, bpf, ptrace, keyctl, io_uring_register, fanotify_init, and perf_event_open.

According to a disclosed embodiment, the enforcing may comprise restricting access to at least one of a file or a directory based on the enforcement rules.

According to a disclosed embodiment, the enforcing may comprise applying one or more operational constraints to the operation as defined by the one or more access policies, the one or more operational constraints being selected from: a quota limiting the amount of resources used by the operation, a timeout limiting the duration of the operation, or a rate limit restricting the frequency of operations.

According to a disclosed embodiment, the enforcement may further comprise at least one of: pausing an operation classified as risky or requesting confirmation before resuming execution.

According to another disclosed embodiment, a system for runtime, context-aware per-operation enforcement in a managed resource environment may comprise: an interceptor coupled to the managed resource environment and configured to identify an operation initiated by an autonomous component using the managed resource; an analysis component configured to determine one or more actions designated by the managed resource and contextual data associated with the operation; an evaluation component configured to evaluate, just in time and based on the dynamically determined actions and contextual data, one or more access policies to identify one or more enforcement rules for the operation; and an enforcement component configured to enforce, during execution of the operation, one or more enforcement rules.

According to a disclosed embodiment, the evaluation component may comprise a local policy engine configured to perform policy evaluations in-line.

According to a disclosed embodiment, the evaluation component may be configured to evaluate access policies based on attributes selected from: a user identity, a role, an environment, an active task, a model chain step, a tool name and version, document labels, a time, a geofence, a device posture, and a workload attestation.

According to a disclosed embodiment, the model chain step may comprise a discrete stage in a multi-step execution pipeline of the managed resource, and the evaluation component is configured to determine enforcement rules for each model chain step independently.

According to a disclosed embodiment, the enforcement component may be configured to bind one or more enforcement rules and one or more audit records to a specific model chain step.

According to a disclosed embodiment, the evaluation component may be configured to bind one or more enforcement rules to the context of the model chain step, including one or more of an entity invoking the step, the purpose of the step, and resources permitted for the step.

According to a disclosed embodiment, the enforcement component may be configured to log and audit operations and actions designated by the managed resource as part of the enforcement rules.

According to a disclosed embodiment, the analysis component may further be configured to analyze contextual data associated with the operation.

According to a disclosed embodiment, the enforcement of the one or more enforcement rules may be on the analysis of the contextual data.

According to a disclosed embodiment, the enforcement rules may be associated with one or more permitted capabilities.

According to a disclosed embodiment, the enforcement component may be configured to enforce the one or more enforcement rules using at least one of an in-process enforcement mechanism and an out-of-process enforcement mechanism.

According to a disclosed embodiment, the enforcement component may be configured to enforce the one or more enforcement rules based on utilizing at least one of a kernel-level policy enforcement point and a user-space policy enforcement point.

According to a disclosed embodiment, the enforcement may be performed in real time.

According to another disclosed embodiment, a non-transitory computer readable medium may include instructions that, when executed by at least one processor, cause the at least one processor to perform operations for controlling access to a resource by an artificial intelligence orchestration system. The operations may comprise identifying, at an authorization component associated with the orchestration system, a request to perform an operation, the request being initiated by an entity; identifying an input to a machine learning model associated with the request; dynamically evaluating the input to determine a first distance metric of the input relative to a mission associated with the operation; performing a first validation of the operation based on the first metric; identifying an execution plan associated with the operation, the execution plan being generated using the machine learning model; identifying a reference execution plan associated with the operation; dynamically evaluating the execution plan to determine a second distance metric of the execution plan relative to the reference execution plan; and performing a second validation of the operation based on the second distance metric.

According to a disclosed embodiment, performing a first validation of the operation based on the first metric may comprise applying at least one additional machine-learning model.

According to a disclosed embodiment, at least one of the first distance metric or the second distance metric may be based on temporal features of a session including at least one of an action order or a time interval between actions.

According to a disclosed embodiment, the reference execution plan may include one or more expected operations.

According to a disclosed embodiment, the second distance metric of the operation relative to the reference execution plan may be based on a comparison of the execution plan to the one or more expected operations.

According to a disclosed embodiment, the second validation may include comparing the second distance metric to a threshold distance metric.

According to a disclosed embodiment, the threshold distance metric may be dynamically assigned by the authorization component.

According to a disclosed embodiment, the threshold distance metric may be configured based on an input from a user.

According to a disclosed embodiment, identifying the reference execution plan associated with the operation may include generating the reference execution plan using at least one additional machine-learning model.

According to a disclosed embodiment, the second validation may comprise initiating a human approval workflow for an action.

According to a disclosed embodiment, initiating a human approval workflow may comprise modeling approval by at least one of a human approver or a non-human system component.

According to a disclosed embodiment, the execution plan may be generated by a machine learning component based on an output of the machine learning model.

According to a disclosed embodiment, at least one of the mission associated with the autonomous component or the execution plan may further represent a context of the operation.

According to another disclosed embodiment, there may be a computer-implemented method for controlling access to a resource by an artificial intelligence orchestration system. The method may comprise: identifying, at an authorization component associated with the orchestration system, a request to perform an operation, the request being initiated by an entity; identifying an input to a machine learning model associated with the request; dynamically evaluating the input to determine a first distance metric of the input relative to a mission associated with the operation; performing a first validation of the operation based on the first metric; identifying an execution plan associated with the operation, the execution plan being generated using the machine learning model; identifying a reference execution plan associated with the operation; dynamically evaluating the execution plan to determine a second distance metric of the execution plan relative to the reference execution plan; and performing a second validation of the operation based on the second distance metric.

According to a disclosed embodiment, the second validation may include generating at least one prompt requesting input from a user.

According to a disclosed embodiment, the at least one prompt may be generated based on a comparison of the second distance metric to a threshold distance metric.

According to a disclosed embodiment, the method may further comprise: identifying one or more least-privileged permissions required for the operation; issuing, based on a determination that the operation is valid in each of the first validation and the second validation, an authorization artifact that embeds an ephemeral permission set scoped to the least-privileged permissions; and enabling the operation to execute using the ephemeral permission set.

According to a disclosed embodiment, the authorization artifact may further encode at least one of: a session identifier, a prompt digest, or a reasoning plan identifier.

According to a disclosed embodiment, the method may further comprise performing, based on a determination that the operation is invalid in either of the first validation or the second validation, at least one control action.

According to a disclosed embodiment, the control action may include at least one of blocking the operation, terminating a session, or generating an alert.

According to a disclosed embodiment, identifying the reference execution plan may include identifying a plurality of reference execution plans and the second validation of the operation may be performed based on a plurality of second distance metrics of the execution plan relative to the plurality of reference execution plans.

According to a disclosed embodiment, dynamically evaluating the execution plan to determine a second distance metric of the execution plan relative to the reference execution plan may include evaluating a plurality of outcomes of previous execution plans associated with the operation.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 5 is a flowchart showing an example process for controlling access to a resource by an artificial intelligence orchestration system, consistent with the disclosed embodiments.

FIG. 8 is a flowchart showing an example process 800 for context-aware per-operation enforcement in a managed resource, consistent with the disclosed embodiments.

FIG. 10 is a flowchart showing an example process for controlling access to a resource by an artificial intelligence orchestration system, consistent with the disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securing agentic AI operations described herein overcome several technological problems relating to security, efficiency, and flexibility in the fields of cybersecurity, network communications, and artificial intelligence. For example, the disclosed techniques may analyze individual operations performed within an agentic AI system to grant minimal, task-relevant, and ephemeral permissions based on the purpose of the operation. These permissions may thus be adapted dynamically in real time to ensure least-privilege access, thus reducing any potential attack surface. Consistent with some disclosed techniques, various stages of an agentic AI operation may be analyzed at various "gateways" to provide additional layers of detection. Some disclosed techniques may further be implemented at an MCP tool (or similar tool) itself. Accordingly, the system may intercept individual operations, and enforce policy-based, context-aware access controls on per-operations bases. Such techniques may thus enable fine-grained privilege separation to block unauthorized actions at runtime. Accordingly, the disclosed techniques improve security by providing more advanced techniques to enforce policies within agentic AI systems.

Reference will now be made in detail to the disclosed embodiments, examples of which are illustrated in the accompanying drawings.

Figure 1:
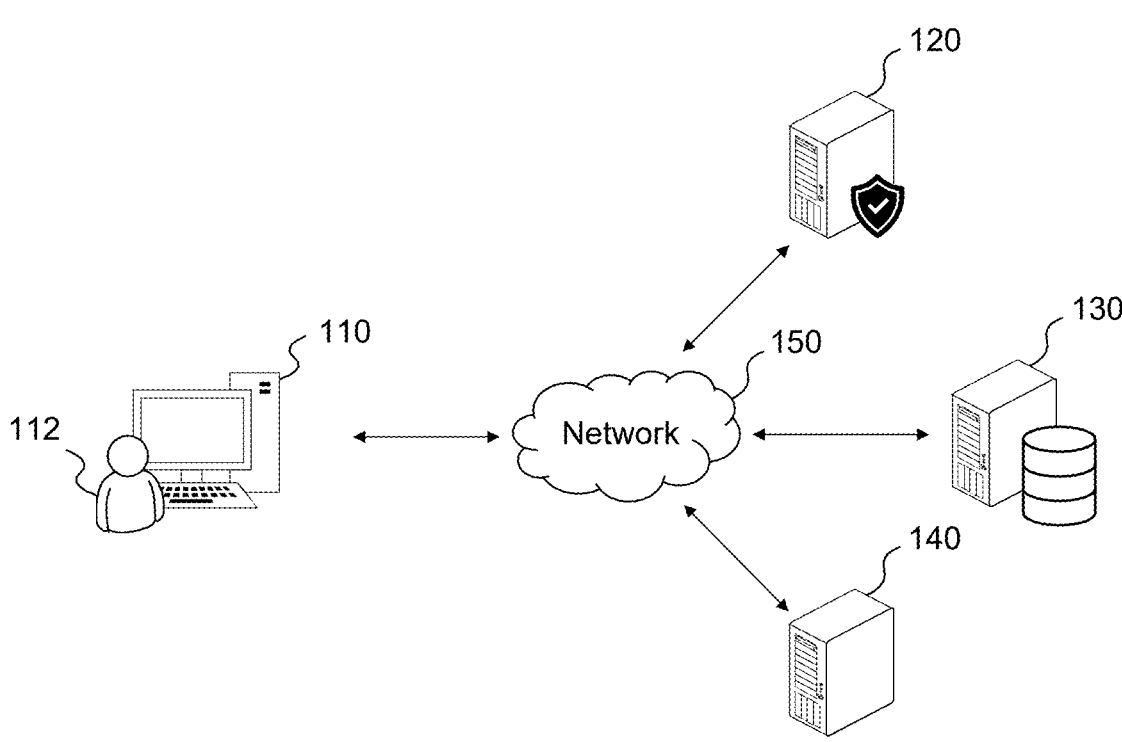
FIG. 1 illustrates an example system environment for monitoring and dynamically authorizing operations associated with artificial intelligence (AI) agents, consistent with the disclosed embodiments.

FIG. 1 illustrates an example system environment 100 for monitoring and dynamically authorizing operations associated with artificial intelligence (AI) agents, consistent with the disclosed embodiments. System environment 100 may include one or more client devices 110, one or more security servers 120, one or more target resources 130, and one or more data sources 140, as shown in FIG. 1. System environment 100 may represent a system or network environment in which various artificial intelligence models (e.g., LLMs, as discussed further below) are used for performing computing operations. For example, client device 110 (or an entity associated with client device 110, such as identity 112) may request to perform a computing operation involving an artificial intelligence model. In some embodiments, this may include agentic AI (or AI Agents), which are capable of making autonomous decisions and executing tasks independently, while optionally engaging human oversight or collaboration at various stages.

In some embodiments, an operation requested through the various artificial intelligence models may include a network-based computing operation. For example, this may include an operation involving a file or other data on target resource 130. Alternatively or additionally, this may include a local computing operation. For example, the local computing operation may be an operation involving a file stored in client device 110. Accordingly, while system environment 100 is shown in FIG. 1 to include target resource 130 and security server 120 separately from client device 110 by way of example, in some embodiments, one or both of target resource 130 and security server 120 may be integrated with client device 110. For example, target resource 130 may be a local resource of client device 110 and security server 120 may be an agent or other process running on client device 110. Accordingly, system environment 100 may not necessarily be a network-based system environment and may be a local environment of client device 110.

The various components of system environment 100 may be configured to communicate over a network 150. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more client device 110. Client device 110 may include any device that may be used for performing various computing operations as described herein. Accordingly, client device 110 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a computing operation. In some embodiments, client device 110 may be a virtual machine (e.g., based on AWS™, Azure™, IBM Cloud™, etc.), container instance (e.g., Docker™ container, Java™ container, Windows Server™ container, etc.), or other virtualized instance. Consistent with the disclosed embodiments, client device 110 may be configured to run various applications, including an orchestrator or agent application for an artificial intelligence model and various related applications, as explained in further detail below.

In some embodiments, client device 110 may be associated with an identity 112. Identity 112 may be any entity that may use client device 110 to request various functions associated with an artificial intelligence model. In some embodiments, identity 112 may be associated with one or more privileges required to perform a computing operation. For example, identity 112 may be a user, an account, an application, a process, a service, a code script, or any other entity or attribute associated with one or more components of system environment 100. In some embodiments, identity 112 may be a user requesting to perform an action associated with one or more artificial intelligence models through client device 110.

Target resource 130 may include any form of computing device that may be the target of a computing operation or computing operation request. Examples of network resource 130 may include SQL servers, databases or data structures holding confidential information, applications (including local, remote, web-based, cloud, or other forms of applications), operating system directory services, cloud-computing resources (e.g., an AWS™ or Azure™ server), IoT equipment (e.g., physical access control devices, video surveillance equipment, etc.), and/or any other computer-based equipment or software that may be accessible over a network. Target resource 130 may also include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to computing operations. In some embodiments, target resource 130 may be a privileged resource, such that access to target resource 130 may be limited or restricted. For example, access to target resource 130 may require a secret (e.g., a password, a username, an SSH key, an asymmetric key, a security or access token, biometric, etc.). In some embodiments target resource 130 may not necessarily be a separate device from client device 110, and may be a local resource. Accordingly, target resource 130 may be a local hard drive, database, data structure, or other resource integrated with client device 110.

Security server 120 may be configured to monitor and/or manage one or more security policies within system environment 100. For example, security server 120 may manage one or more permissions associated with identity 112 (or client device 110) required to perform computing operations within system environment 100. In some embodiments, security server 120 may represent a privileged access management (PAM) system or other access management system implemented within system environment 100. Alternatively or additionally, security server 120 may be a security information and event management (SIEM) resource implemented within system environment 100. Security server 120 may be configured to grant, track, monitor, store, revoke, validate, or otherwise manage privileges of various identities within system environment 100. In some embodiments, security server 120 may be configured to perform various actions for detecting and mitigating unwanted instructions associated with an artificial intelligence model, consistent with the disclosed embodiments. For example, security server 120 may host or be associated with various authorization and/or enforcement components implemented in various forms within system 100, as described in further detail below.

While illustrated as a separate component of system environment 100, it is to be understood that security server 120 may be integrated with one or more other components of system environment 100. For example, in some embodiments, security server 120 may be implemented as part of target network resource 130, client device 110, or another device of system environment 100. In some embodiments, a separate security server may not be used and various security features (e.g., associated with the authorization and/or runtime enforcement components) may be implemented through a security agent running on another device, such as target network resource 130, data source 140, or client device 110. Alternatively or additionally, a security agent on one of these devices may communicate with security server 120 to perform security operations.

In some embodiments, security server 120 (or associated components) may be implemented as a network resource proxy configured to monitor other components within system environment 100. Accordingly, security server 120 may be a proxy service implemented as a separate component within system environment 100, capable of analyzing software and computer codes or scripts within network 110. In other embodiments, security server 120 may be a proxy service implemented as a program or script and may be executed by another component of system environment 100 (e.g., integrated into client device 110 or target resource 130, etc.).

Data source 140 may be any form of resource that may be accessed by an artificial intelligence model, such as an LLM. In some embodiments, data source 140 may include an orchestration system configured to provide information enabling or enhancing features of an LLM. For example, data source 140 may include a Model Context Protocol (MCP) server allowing an LLM to access and utilize external tools, resources, and/or applications. While FIG. 1 generally illustrates a single data source 140, it is to be understood that the same or similar techniques may apply to multiple data sources. Thus, any reference to a data source may equally apply to multiple data sources. Further, various data sources 140 may be configured for different purposes and may operate differently from each other.

Figure 2A:
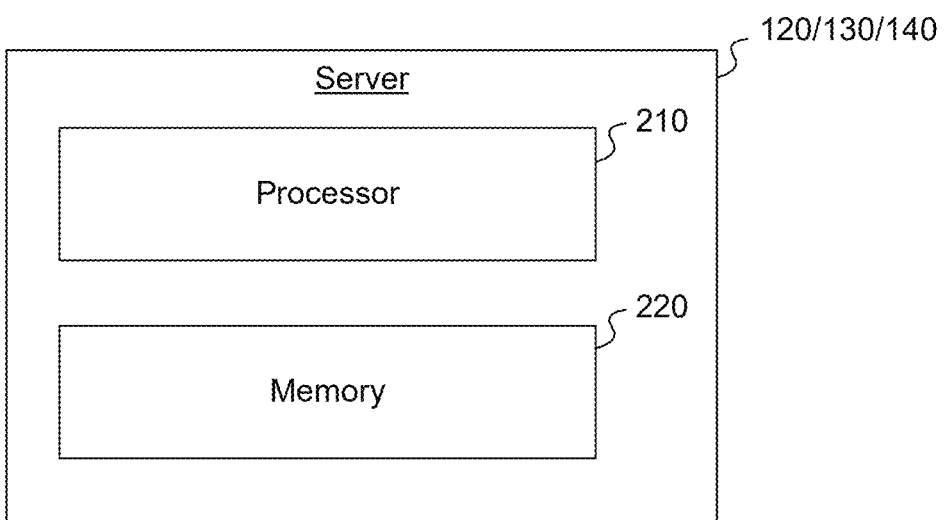
FIG. 2A is a block diagram showing an example server, consistent with the disclosed embodiments.

FIG. 2A is a block diagram showing an example server, consistent with the disclosed embodiments. For example, the server shown in FIG. 2A may correspond to one or more of security server 120, target resource 130, and data source 140. As shown in FIG. 2A, these servers may include a processor (or multiple processors) 210, a memory (or multiple memories) 220, and/or one or more input/output (I/O) devices (not shown).

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in security server 120, target resource 130, or data source 140.

Memory 220 may include one or more storage devices configured to store instructions used by processor 210 to perform functions related to client device 110. The disclosed embodiments are not limited to particular software programs or devices configured to perform dedicated tasks. For example, memory 220 may store a single program, such as a user-level application, that performs the functions associated with the disclosed embodiments, or may comprise multiple software programs. Additionally, processor 210 may, in some embodiments, execute one or more programs (or portions thereof) remotely located from security server 120 or target resource 130. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a network drive, a cloud storage device, or any other storage device.

Figure 2B:
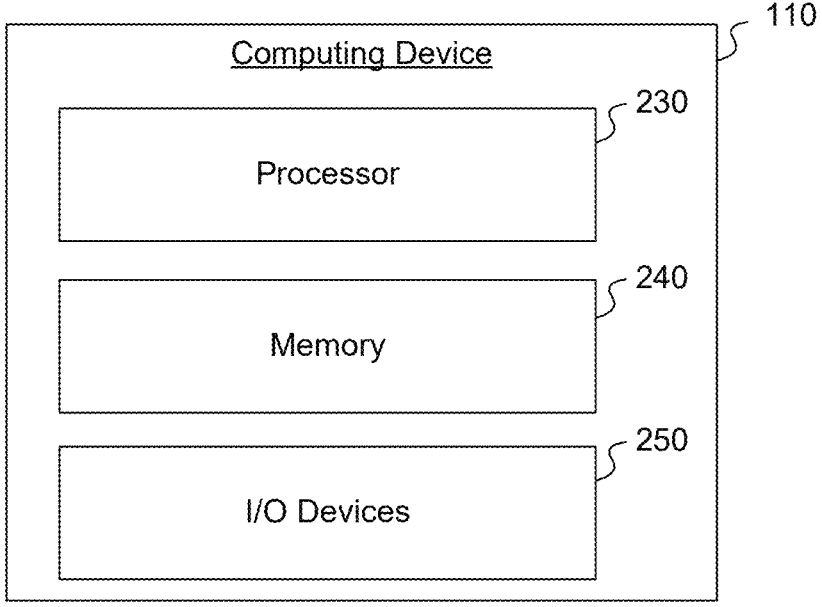
FIG. 2B is a block diagram showing an example client device, consistent with the disclosed embodiments.

FIG. 2B is a block diagram showing an example client device 110, consistent with the disclosed embodiments. Client device 110 may include one or more dedicated processors and/or memories. For example, client device 110 may include a processor (or multiple processors) 230, and a memory (or multiple memories) 240, as well as one or more input or output devices ("I/O" devices) 250 as shown in FIG. 2B.

As with processor 210, processor 230 may take the form of, but is not limited to, a microprocessor, embedded processor, or the like, or may be integrated in a system on a chip (SoC). Furthermore, according to some embodiments, processor 230 may be from the family of processors manufactured by Intel®, AMD®, Qualcomm®, Apple®, NVIDIA®, or the like. Processor 230 may also be based on the ARM architecture, a mobile processor, or a graphics processing unit, etc. The disclosed embodiments are not limited to any type of processor configured in client device 110.

Further, similar to memory 220, memory 240 may include one or more storage devices configured to store instructions used by the processor 230 to perform various functions. The disclosed embodiments are not limited to particular software programs or devices configured to perform dedicated tasks. Additionally, processor 230 may, in some embodiments, execute one or more programs (or portions thereof) remotely located from security server 120. Furthermore, memory 240 may include one or more storage devices configured to store data for use by the programs. Memory 240 may include, but is not limited to a hard drive, a solid state drive, a CD-ROM drive, a peripheral storage device (e.g., an external hard drive, a USB drive, etc.), a network drive, a cloud storage device, or any other storage device.

Client device 110 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system environment 100 through network 140. For example, client device 110 may use a network adaptor to access various resources in system environment 100. In some embodiments, the I/O devices 250 may also comprise a touchscreen configured to allow a user to interact with client device 110 and/or an associated computing device. I/O devices 250 may comprise a keyboard, mouse, trackball, touch pad, stylus, biometric interface, and the like.

Consistent with the disclosed embodiments, client device 110 may be used to access one or more agentic artificial intelligence applications, which may be performed autonomously or at least semi-autonomously. For example, user 112 may interact with one or more artificial intelligence applications to perform various tasks. The artificial intelligence applications may access various resources, such as data source 140, to carry out the tasks. For example, the artificial intelligence application may be an agentic AI application that accesses an MCP server (or other orchestration system) to carry out requested tasks. System 100 may include various security components to ensure that actions performed through these autonomous agents are authorized and secure.

Figure 3:
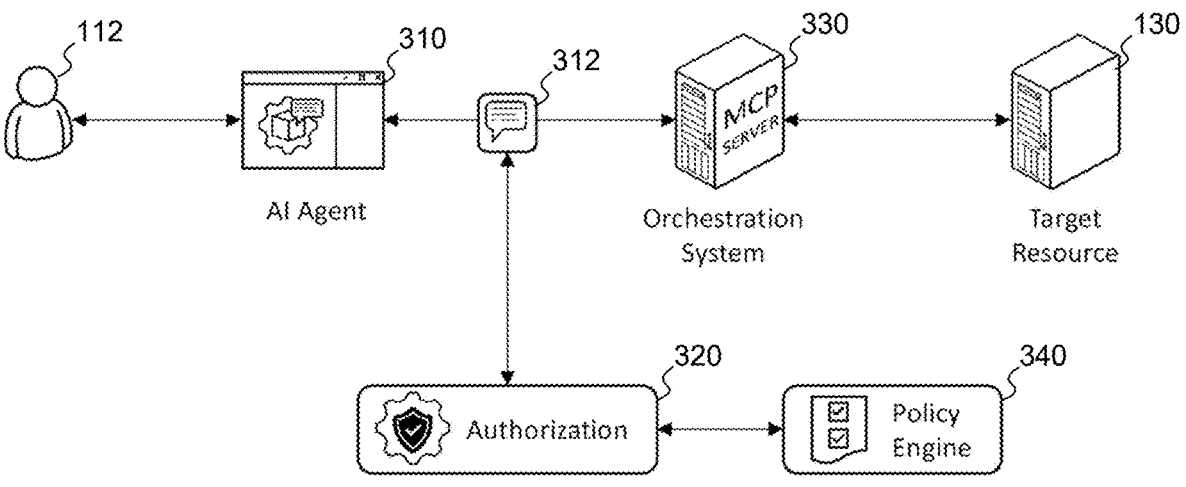
FIG. 3 is a block diagram illustrating an example system including an artificial intelligence orchestration system, consistent with the disclosed embodiments.

In some embodiments, the disclosed techniques may provide dynamic purpose-based authorization for artificial intelligence agents. An authorization layer may receive user or agent requests, analyze the operation, purpose, and context of the requests (e.g., using LLMs), and evaluate the request based on defined policies. The authorization layer may then allow a requested operation (for example, by granting ephemeral permissions scoped to the specific operation) or may perform various control actions. FIG. 3 is a block diagram illustrating an example system 300 including an artificial intelligence orchestration system, consistent with the disclosed embodiments. System 300 may be used to carry out various tasks using one or more trained models. As shown in FIG. 3, system 300 may include an AI agent 310, an orchestration system 330, and a target resource 130. While various components are shown in FIG. 3 for purposes of illustration, the components and the arrangement thereof are not limiting and system 300 may include additional, fewer, or different components than those shown in FIG. 3.

AI agent 310 may act as an interface between a user, such as identity 112, and trained models. For example, AI agent 310 may be configured to access one or more LLMs to carry out various tasks requested by identity 112. AI agent 310 may use a dedicated LLM interaction library, such as LangChain™, LangGraph™, Haystack™, LlamaIndex™, or similar libraries. In some embodiments, AI agent 310 may be associated with user interface application for a specific model, such as a chat-based interface, a voice assistant, a reasoning model, or the like. Consistent with the disclosed embodiments, AI agent 310 may be an agentic artificial intelligence and thus may perform at least some tasks autonomously. For example, a user may input a request, which AI agent 310 may analyze to determine various actions which may be performed automatically without further input from the user. Accordingly, AI agent 310 may automatically respond with procedural, algorithmic, and human-like creative steps, to produce results. In some embodiments, AI agent 310 may be implemented through a browser. For example, AI agent 310 may be a browser application, a plugin or extension installed on a browser, a web-based application accessible through a browser, or the like.

As indicated in FIG. 3, AI agent 310 may be configured to access an orchestration system 330 to carry out various tasks. In some embodiments, orchestration system 330 may include an MCP server. Accordingly, orchestration system 330 may act as an interface through which AI agent 310 can discover and use capabilities from various external systems. AI agent 310 may initially request a list of all of the tools, resources, and prompts provided by orchestration system 330, and orchestration system 330 server may respond with a list of functionality descriptor information, which may include a list of action identifiers, associated descriptions, and arguments. Based on this list AI agent 310 may know which tools it can potentially leverage and/or make available to its embedded LLM for future interactions. In some embodiments, AI agent 310 may clone (e.g., download) some or all of the source code for an MCP server to create a local copy of the MCP server repository. Accordingly, AI agent 310 may be configured to perform at least some functions locally without contacting orchestration system 330 for a particular request. Alternatively or additionally, orchestration system 330 may be remote and AI agent 310 may be configured to call functions at orchestration system 330 to perform various tasks. While an MCP server is used by way of example, orchestration system 330 may include any form of data source, server, or other resource that may be accessed by an agentic AI application, which may associated with various other communication protocols.

To perform various autonomous actions using orchestration system 330, AI agent 310 may generate one or more requests to orchestration system 330, such as request 312 shown in FIG. 3. Performing this request may implement various functionalities provided by orchestration system 330, such as those defined through functionality descriptor information provided by orchestration system 330. Request 312 may result in an operation performed at target resource 130, as indicated in FIG. 3.

Consistent with the disclosed embodiments, system 300 may include an authorization component 320 for analyzing request 312. Authorization component 320 may provide an authorization layer as part of system 300 to ensure request 312 is not used, either inadvertently or intentionally, to perform harmful or unwanted operations on or otherwise in association with target resource 130. To analyze request 312, authorization component 320 may perform a contextual investigation of the operation. This investigation may consider information such as user identity, operational context, the intended goal of request 312, or various other information, including an input to a machine learning model associated with the request, metadata associated with the autonomous component, an identity of a user associated with the autonomous component, a role of a user associated with the autonomous component, an identifier of a tool associated with the orchestration system, a model chain step, an identifier associated with a target resource, a data classification, a time, a location, a device posture, a historical operation, past operations performed by the autonomous components, past operations performed by an identity associated with a user associated with the autonomous components, a workload attestation, or any other information that may be relevant. Authorization component 320 may then apply various policies to determine the minimal set of permissions required, and may generate ephemeral permissions for the specific operation, as described further below with respect to process 400.

Authorization component 320 may be implemented in various ways in association with AI agent 310. In some embodiments, authorization component 320 may be configured to monitor communications between AI agent 310 and orchestration system 330 to identify request 312. For example, authorization component 320 may be implemented as a proxy component configured to intercept request 312. Alternatively or additionally, AI agent 310 may be configured to direct request 312 to authorization component 320 for authorization prior to request 312 being sent to authorization component 320. In some embodiments, authorization component 320 may be integrated with various other components. For example, authorization component 320 may be implemented as a wrapper or other code implemented as part of AI agent 310. Accordingly, authorization component 320 may be implemented fully, or at least partially, on client device 110. While authorization component 320 is illustrated as interacting with request 312 in FIG. 3, it may be configured to monitor various other tasks performed by AI agent 310, as explained in further detail below with respect to FIG. 9.

In some embodiments, authorization component 320 may be configured to access a policy engine 340 for authorizing a request and generating ephemeral permissions. Policy engine 340 may be any component that stores or otherwise provides access to various policy information. In some embodiments, policy engine 340 may include a server. For example, policy engine 340 may correspond to security server 120 described above. Alternatively or additionally, policy engine 340 may correspond to a service or application, such as a cloud-based service, or the like. In some embodiments, request 312, authorization component 320, and/or policy engine 340 may not necessarily be a separate components. For example, policy engine 340 may be integrated with authorization component 320 and may not necessarily be a standalone component. Similarly, although shown separately, request 312, authorization component 320, and/or policy engine 340 may be coupled to or associated with various other components, such as orchestration system 330, and may not necessarily be separate or standalone components. For example, authorization component 320 and/or policy engine 340 may be implemented as designated modules or components of orchestration system 330.

Figure 4:
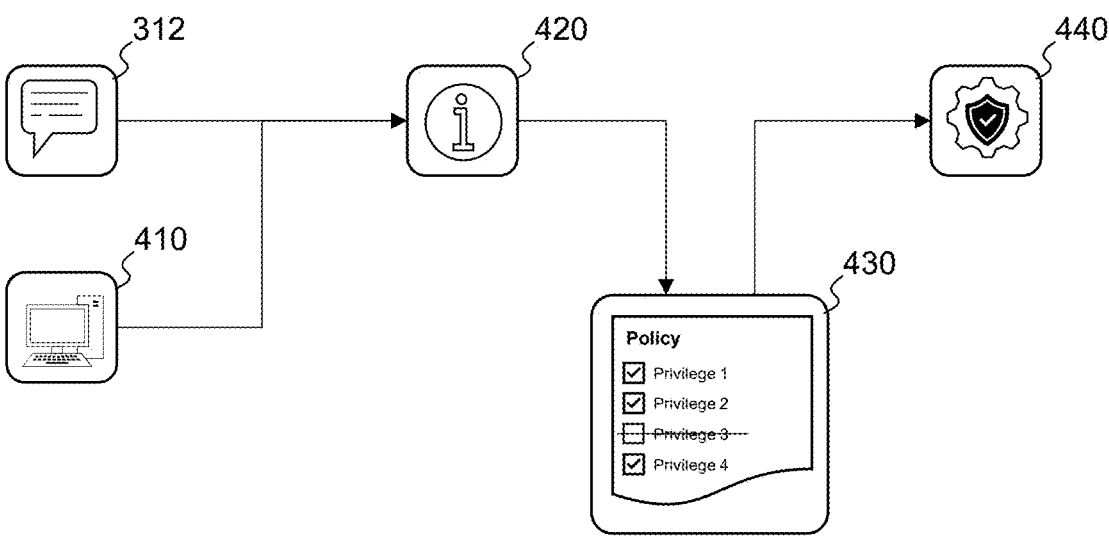
FIG. 4 is a process flow diagram illustrating an example process for controlling access to a resource by an artificial intelligence orchestration system, consistent with the disclosed embodiments.

FIG. 4 is a process flow diagram illustrating an example process 400 for controlling access to a resource by an artificial intelligence orchestration system, consistent with the disclosed embodiments. Process 400 may be carried out within system 300 described above. For example, process 400 may represent an authorization process performed using authorization component 320.

As explained above, authorization component 320 may be configured to receive or otherwise access request 312 to perform an operation. Request 312 may be initiated by an autonomous component, such as AI agent 310. In some embodiments, request 312 may include various information providing context regarding the requested operation. For example, the request may identify a target of the request (e.g., target resource 130), a source of the request (e.g., identity 112), or various other information that may be relevant to authorizing the request and/or determining a scope of permissions to perform the requested operation. In some embodiments, the information may be included in the request itself (e.g., in a body of the request) or in information associated with the request, such as metadata associated with the request, etc.

Alternatively or additionally, various information may be external to the request. For example, authorization component 320 may access various environmental information 410, which may provide additional context to request 312. Environmental information 410 may include any information not directly included in request 312, such as data associated with a current state of AI agent 310, client device 110, identity 112, target resource 130, orchestration system 330, or any other component of system 100. For example, environmental information 410 may include, but is not limited to, logged keystroke information, logged mouse movement information, location data (e.g., a current location of client device 110), geofence information, IP address information, applications installed on client device 110, a running environment, operating system or application version information, hardware specifications, document labels or other data, biometric data, internet browsing data, or any other information that may provide context for a requested operation. In some embodiments, environmental information 410 may include historical information. For example, this may include previous requests associated with AI agent 310, identity 112, or target resource 130, changes to a role or policy, whether previous requests were authorized or denied, previous ephemeral permissions associated with identity 112, or any other historical data.

Authorization component 320 may analyze request 112 and/or environmental information 410 to derive information 420, as indicated in FIG. 4. Information 420 may include any information that at least partially represents a purpose or context of the operation requested in request 312. This purpose or context information may include any of the various information described above with respect to request 312 and environmental information 410. In some embodiments, the information 420 may include metadata associated with AI agent 310. For example, the metadata may include an identifier of AI agent 310, a type of application of AI agent 310, time or location information, or the like. In some embodiments, information 420 may include information indicating a communication of the AI agent with the LLM. For example, this may include an indication of the processing the agent does in order to make a decision, which may include data it sends to the LLM and the response the LLM provides. As another example, information 420 may include information indicating the interaction between a user and the agent, when applicable. For example, this may include the prompt and/or the action the user asks from the agent. In some embodiments, information 420 may include identity of a user associated with the autonomous component, such as a name or other identifier of identity 112. In some embodiments, information 420 may include privilege information associated with identity 112, such as a role of identity 112. As another example, information 420 may include information about orchestration system 330, such as an identifier of a tool associated with the orchestration system. Information 420 may include various other information, such as a model chain step, an identifier associated with a target resource, a data classification, a time, a location, a device posture, past operations performed by the autonomous components, past operations performed by an identity associated with a user associated with the autonomous components, a workload attestation, or any other information that may be relevant.

Authorization component 320 may then dynamically evaluate information 420 to identify permissions required for performing the operation requested by request 312. For example, this may include determining policy information 430, as indicated in FIG. 3. Consistent with the disclosed embodiments, policy information 430 may be tailored to request 412. For example, policy information 430 may represent least-privileged permissions required to perform request 312. In some embodiments, policy information 430 may be determined using one or more policies accessed from policy engine 340, as described above. For example, authorization component 320 may analyze one or more predefined policies to identify which permissions are appropriate for performing a requested operation considering contextual information 420. In some embodiments, the predefined policies may be defined by a user, such as an administrator associated with client device 110. Accordingly, the predefined policies may define which operations are allowed under specific contexts or for specific purposes. Policy information 430 may thus be purpose-oriented in that it may be narrowly tailored to provide only those operations that further the intended purpose of identity 112.

In some embodiments, process 400 may include invoking a human approval workflow process. For example, certain privileged operations may be sensitive and may require approval from a particular user (e.g., an administrator) prior to execution. As another example, authorization component 320 may be uncertain as to whether a particular operation is appropriate under a particular context. For example, authorization component 320 may generate confidence scores for one or more aspects of policy information 430 and may request human approval if any aspect of policy information 430 fails to meet a confidence score threshold. In some embodiments, an AI agent may be configured to approve various actions on behalf of a human user. For example, a workflow may be defined such that a purchase must be approved by a particular organization member. When not available, or for any alternative reason, such as for the purpose of increasing efficiency and speed of operation, the member may delegate an approval decision within a range of conditions to an AI Agent. For example, the member may define a rule allowing orders of goods up to $50. As another example, human approval may be required for entry to a secured area. Security personnel may define a rule enabling an AI agent to grant access when a face identified with at least 99% certainty, the identified individual has accessed the premises at least 3 times in the past month with at least one access being approved by a human, and where the face matches an identification tag presented by the individual. Otherwise, the AI Agent may raise an alert to the security guard. Accordingly, the disclosed embodiments may enable a wide range of customizable agentic AI-based rules in place of a human approval.

Authorization component 320 may then issue an authorization artifact 440 based on policy information 430. For example, authorization artifact 440 may embed an ephemeral permission set, which may be scoped to the least-privileged permissions defined by policy information 430. Using authorization artifact 440, AI agent 310 may continue to carry out request 312. For example, request 312 may be implemented to invoke an operation carried out at target resource 130 using authorization artifact 440. Thus, through providing authorization artifact 440, authorization component 320 may cause the quested operation to execute. In some embodiments, authorization artifact 440 may include or may be associated with a temporary credential that embodies the ephemeral permission set. Accordingly, AI agent 310 (and/or orchestration system 330) may assert this temporary credential when performing the requested operation at target resource 130. Causing the operation to be performed may be direct or indirect, in various implementations.

Notably, authorization artifact 440 will not allow operations that exceed the scope of a particular purpose of identity 112. For example, if request 312 is associated with pulling information from a database residing on target resource 130 to populate a spreadsheet, the policies may specify that a write operation is not permitted for this purpose. Accordingly, policy information 430 (and also authorization artifact 440) may be restricted to provide read-only permissions. Thus AI agent 310 may not be manipulated to perform operations exceeding the original scope the user.

In some embodiments, authorization artifact 440 may further be tailored to restrict the scope of the permissions it provides. For example, authorization artifact 440 may encode a time limit indicating a duration for which the ephemeral permissions are valid. As another example, authorization artifact 440 may encode a particular usage count associated with the defined permissions. Accordingly, AI agent 310 (and identity 112) may only be enabled to perform a requested operation during a limited time window or for a limited number of times. In some embodiments, authorization artifact 440 may include a signature or other information that binds at least one of a purpose, a scope, and an expiry.

In some embodiments, authorization artifact 440 may include a purpose binding, which may further limit the scope of authorization artifact 440. For example, each operation may include purpose information in the form of a workflow id, data classification, or requested scope. A defined policy may require a purpose of request 312 to match this defined purpose information. In some embodiments, authorization component 320 may record various information associated with a requested operation to generate an audit record. In some embodiments, recording the audit record may include binding the operation to at least one of a workflow identifier or a step identifier.

Authorization component 320 may further be configured to invalidate authorization artifact 440 based on various conditions. In some embodiments, authorization component 320 may determine that a requested operation is complete and thus may revoke the ephemeral permission set associated with authorization artifact 440. If authorization artifact 440 is associated with a temporary credential, for example, this may include revoking the temporary credential. In some embodiments, authorization component 320 may take further actions, such as clearing secret material, such as information accessed using request 312, from memory. The ephemeral permission set may be revoked based on other conditions, such as a time limit, a number of requests, an attempt to perform an operation not authorized by the ephemeral permission set, or the like.

In some embodiments, authorization component 320 may be configured to deny any operations associated with request 312 based on information 420 and associated policies. For example, request 312 may be for an operation that is impermissible for a particular context and thus, there may be no overlap between the requested operations and the available permissions defined by relevant policies. Accordingly, rather than generating authorization artifact 440, authorization component 320 may deny request 312.

According to some embodiments, authorization component 320 may be implemented as an additional trained model. For example, authorization component 320 may be an LLM trained to identify and assess policy information that may be relevant based on contextual information. For example, the LLM may analyze each operation in real time to extract a purpose of a request, the target tools or operations involved (e.g., the tools withing orchestration system 330), the identity type triggering the operation (e.g., a human, service, or application), the context of the identity, a history of operations coming from different inputs, or other contextual information above to match user-defined privileges to the particular context. Such LLMs may recognize subtle contextual cues within metadata and environmental data, allowing them to catch complex attempts to perform unwanted operations. Accordingly, when implemented as an LLM, authorization component 320 may be equipped to handle more nuanced purpose-driven authentication. Accordingly, various steps described above, such as deriving and/or evaluating information 420 may include application of a machine-learning model. In some embodiments, authorization component 320 may be a "personalized" model for a particular user or application. The LLM may thus be tuned to assess contextual information associated with a particular user to better assess an intended purpose for that particular user.

FIG. 5 is a flowchart showing an example process 500 for controlling access to a resource by an artificial intelligence orchestration system, consistent with the disclosed embodiments. Process 500 may be performed by at least one processor of a server, such as processor 230 described above. In some embodiments, some or all process 500 may be performed by at least one processor of a computing device, such as processor 210 described above. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described with respect to, for example, FIGS. 3, 4, 6, 7, 8, 9, and 10.

In step 510, process 500 may include receiving a request to perform an operation. The request may be received at an authorization component integrated with an orchestration system. For example, step 510 may include receiving request 312, at authorization component 320, as described above. In some embodiments, the request may be initiated by an autonomous component. For example, the request may be generated by AI agent 310.

In step 520, process 500 may include deriving, from the request and data associated with an environmental state, information representing at least one of a purpose and a context of the operation. For example, step 520 may include deriving information 420 based on request 312 and environmental information 410, as described above. In some embodiments, deriving the information representing the purpose may comprise applying at least one machine-learning model. In some embodiments, the model may be personalized to an individual user. For example, the model may incorporate historical interaction data associated with an initiator of the operation.

As explained above, context of the operation may include a wide variety of attributes, such as metadata associated with the autonomous component, an identity of a user associated with the autonomous component, a role of a user associated with the autonomous component, an identifier of a tool associated with the orchestration system, a model chain step, an identifier associated with a target resource, a data classification, a time, a location, a device posture, a historical operation, past operations performed by the autonomous components, past operations performed by an identity associated with a user associated with the autonomous components, a workload attestation, or other attributes. The information may be obtained from various attributes, such as a user identity, a user role, historical requests of the user, a running environment, an active task associated with the operation, a name and version of a tool associated with the orchestration system, document labels, a time, a geofence, a device posture, past operations performed by the autonomous component, past operations performed by an identity of a user associated with the autonomous components, a workload attestation, or other attributes. In some embodiments, the context may include communications between the AI agent and the LLM and/or an interaction between a user and the agent, as described above.

In step 530, process 500 may include dynamically evaluating the information to identify one or more least-privileged permissions required for the operation. For example, step 530 may include evaluating information 410 to determine policy information 430. Consistent with the disclosed embodiments, step 530 may include utilizing a policy engine coupled to the orchestration system, such as policy engine 340. In some embodiments, evaluating the information may further comprise initiating a human approval workflow (or approval delegated to an AI agent) for an action. For example, this may include requesting confirmation from an originator of the request, an administrator, or other human user. In some embodiments, evaluating the information may include analyzing one or more rules pre-defined by an entity associated with a customer. For example, a user (e.g., identity 112, an administrator, etc.) may specify various custom rules for an operation. Accordingly, the least-privileged permissions may reflect these custom rules.

In some embodiments, step 530 may include applying at least one machine learning model, as described above. In some embodiments, the machine learning model may be the same machine learning model as applied in step 520 (if applicable). For example, a single model may be configured to analyze request 312 and environmental information 410 to determine least-privileged permissions. Alternatively, these may be separate models trained to perform discrete tasks of deriving the information and evaluating the information to identify least-privileged permissions.

In step 540, process 500 may include issuing an authorization artifact that embeds an ephemeral permission set scoped to the least-privileged permissions. For example, step 540 may include issuing authorization artifact 440, as described above. The authorization artifact may encode various restrictions for execution of the operation. For example, the authorization artifact may encode at least one of a time limit, a usage count, or a signature that binds at least one of a purpose, a scope, and an expiry. In some embodiments, the authorization artifact may encode a purpose binding comprising at least one of: a workflow identifier, a step identifier, a data classification, or a requested scope, and wherein the evaluation requires the purpose to match a permitted value.

In some embodiments, the authorization artifact may include various other information associated with a preliminary request, such as the original prompt, a sequence of actions performed, or the like. This information may thus represent a trace of approved request presented in the flow, which may be embedded in the artifact (e.g., a token). This information may thus propagate to downstream services, which may use this information to validate associated actions. This prompt, flow history (previous actions) may be stored on the token (in-band) or in an external service (out of band). Providing this information to downstream services may provide the ability to perform further complex authorization flows, not just one in the gateway.

In step 550, process 500 may include enabling the operation to execute using only the ephemeral permission set. For example, causing the operation to execute may comprise provisioning a temporary credential that embodies the ephemeral permission set. In some embodiments, causing the operation to execute may include imposing various constraints. For example, causing the operation to execute comprises constraining at least one of: a prompt scope, a target selection, or an environment configuration.

In some embodiments, process 500 may include various other actions associated with the operation. For example, process 500 may include invalidating the authorization artifact upon completion of the operation or upon satisfaction of a revocation condition, as described above. This may include revoking a temporary credential and clearing secret material from memory. As another example, process 500 may further include recording one or more audit records associated with the operation. Recording the audit may comprise binding the operation to at least one of a workflow identifier or a step identifier, as described above. In some embodiments, the authorization component may as a proxy or wrapper for an agentic artificial intelligence tool framework.

Variations of process 500 are also contemplated under the disclosed embodiments. In some embodiments, process 500 may be adapted to allow modified versions of a requested operation. For example, following step 520, process 500 may include dynamically evaluating the information, to identify one or more parameters for adapting the operation. For example, this may include analyzing information 420 to determine modifications to the requested operation that would conform to one or more policies. Process 500 may further include modifying the request based on the parameters to generate a modified request. For example, this may include modifying request 312 to generate a modified request. Process 500 may further include causing the operation to execute the modified request, similar to step 550.

The various techniques described above may be beneficial, for example, in detecting potentially unwanted operations initiated by a user. If the user is malicious, they could potentially manipulate prompts, give harmful instructions, or misuse tools to steal data or bypass security controls. However, by tailoring permissions to a particular purpose or context of the user, the system may adapt permissions dynamically in real time, ensuring least privilege access and reducing the attack surface. While a malicious user is one example use scenario, the disclosed techniques may be equally useful for non-malicious users that may inadvertently perform unwanted operations.

In some embodiments, the disclosed techniques may be configured to address potentially malicious (or at least unwanted) actions by a tool itself. Accordingly, rather than (or in addition to) authorizing operations based on a purpose of the operation, a component may be configured to analyze individual operations within the orchestration system. The disclosed techniques thus may provide a per-operation enforcement component for a particular Agentic AI tool framework.

In such embodiments, a runtime enforcement component may attach to a particular server process, such as orchestration system 330 (which may include, for example, an MCP server). The enforcement component may intercept operations to identify the specific operation being performed and may apply policy-based access controls that define which privileges are permitted for each operation. Accordingly, the enforcement component may apply context-aware rules based on available contextual information, such as user, time, and location. The agent may block or log unauthorized actions, including system calls, file access, or network requests, and may request user or administrative authorization for suspicious or unclassified actions. This flow may enable fine-grained privilege separation within the tool's process, protecting host and network resources from misuse or malicious behavior, and ensuring that each operation is executed within the strict boundaries defined by policy and context.

Figure 6:
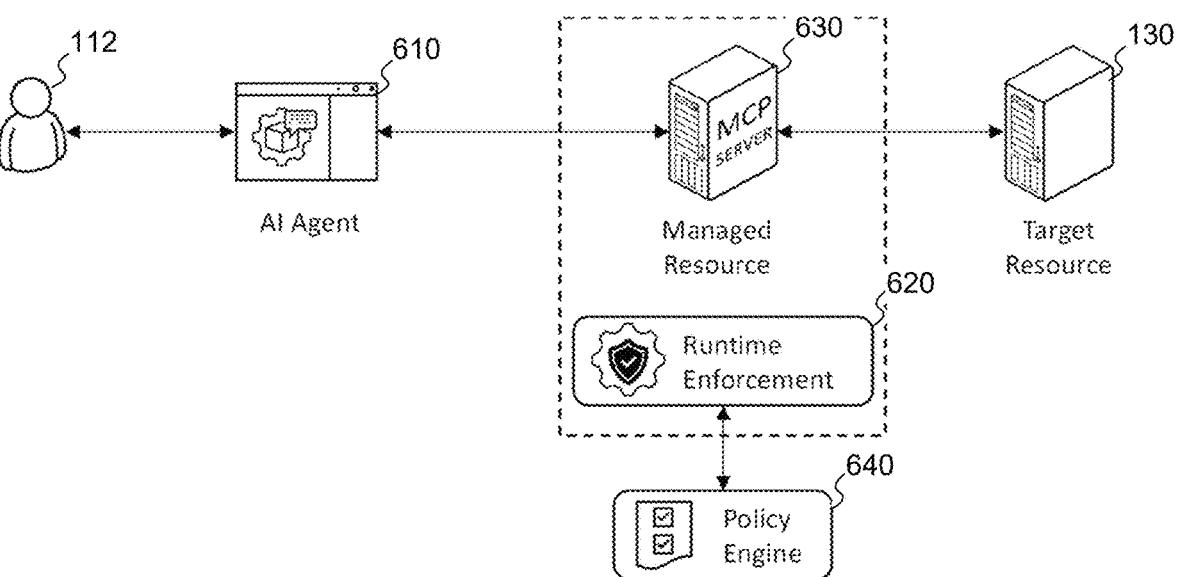
FIG. 6 is a block diagram illustrating another example system including an artificial intelligence orchestration system, consistent with the disclosed embodiments.

FIG. 6 is a block diagram illustrating another example system 600 including an artificial intelligence orchestration system, consistent with the disclosed embodiments. As with system 300, system 600 may be used to carry out various tasks using one or more trained models. For example, system 600 may include an AI agent 610, which may be the same as or similar to AI agent 310 and a target resource 130. System 600 may further include a managed resource 630 and a runtime enforcement component 620. While various components are shown in FIG. 6 for purposes of illustration, the components and the arrangement thereof are not limiting and system 600 may include additional, fewer, or different components than those shown in FIG. 6.

Managed resource 630 may refer to any form of tool or other resource that may be accessed by AI agent 610. In some embodiments, managed resource 630 may include a tool provided by or otherwise associated with an MCP server that is accessed by AI agent 610 to perform various tasks. For example, managed resource 630 may be a particular tool provided by orchestration system 330. Accordingly, AI agent 610 may be configured to call particular functions defined by managed resource 630 to perform various tasks. While an MCP tool is used by way of example, managed resource 630 may include any form of resource that may be accessed by an agentic AI application.

As discussed above with respect to AI agent 310, AI agent 610 may generate one or more requests to implement various functionalities provided by managed resource 630.

Runtime enforcement component 620 may be coupled to managed resource 630 and may monitor operations performed using managed resource 630 to prevent harmful or unwanted operations on target resource 130. Accordingly, whereas authorization component 320 may intercept and analyze requests to orchestration system 330, runtime enforcement component 620 may identify and analyze operations as they are performed. Thus orchestration system 330 may be best equipped to detect unwanted actions by a user, such as identity 112. Runtime enforcement component 620, on the other hand, may operate at the sandboxing level within the environment of the agentic AI tool and thus be better equipped to detect potentially malicious or unwanted operations by the tool itself.

Runtime enforcement component 620 may be implemented in various ways in association with managed resource 630. In some embodiments, runtime enforcement component 620 may be integrated within managed resource 630 and thus may be running on orchestration system 330 (i.e., as part of data source 140). For example, runtime enforcement component 620 may be implemented via a user-space interceptor and an operating system control configured to mediate one or more system calls at orchestration system 330. In some embodiments, runtime enforcement component 620 may mediate system calls through a filtering system calls at a kernel. For example, runtime enforcement component 620 may filter calls such as open, connect, clone, unshare, mount, bpf, ptrace, keyctl, io_uring_register, fanotify_init, perf_event_open, or any other calls that may be relevant for enforcing policies. A person of ordinary skill would recognize that various other techniques for implementing runtime enforcement component 620 may be implemented. In some embodiments, runtime enforcement component 620 may consist of separate components configured to perform various tasks. For example, runtime enforcement component 620 may include an interceptor coupled to the managed resource environment, an analysis component for analyzing various actions, an evaluation component for evaluating access policies, and an enforcement component for enforcing rules.

In some embodiments, runtime enforcement component 620 may be configured to access a policy engine 640 for authorizing requested operations. As with policy engine 340, policy engine 640 may be any component that stores or otherwise provides access to various policy information. In some embodiments, policy engine 640 may include a server. For example, policy engine 640 may correspond to security server 120 described above. Alternatively or additionally, policy engine 640 may correspond to a service or application, such as a cloud-based service, or the like. In some embodiments, policy engine 640 may be integrated with runtime enforcement component 620 and may not necessarily be a separate component. Accordingly, policy engine 640 may be local to runtime enforcement component 620, which may reduce latency for enforcing policies by runtime enforcement component 620. In some embodiments, policy engine 340 and policy engine 640 may be the same policy engine. Accordingly, both authorization component 320 and runtime enforcement component 620 may be implemented in the same system and may both access policy engine 340/640 to enhance security for agentic AI operations.

Figure 7:
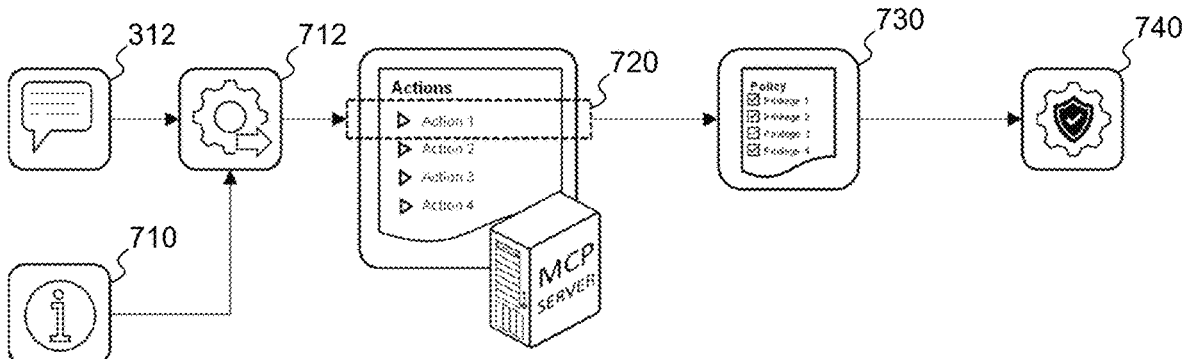
FIG. 7 is a process flow diagram illustrating an example process for context-aware per-operation enforcement in a managed resource, consistent with the disclosed embodiments.

FIG. 7 is a process flow diagram illustrating an example process 700 for context-aware per-operation enforcement in a managed resource, consistent with the disclosed embodiments. Process 700 may be carried out within system 600 described above. For example, process 700 may represent an enforcement process performed using runtime enforcement component 620.

As explained above, runtime enforcement component 620 may be configured to identify an operation initiated by an autonomous component using managed resource 630. For example, AI agent 610 may generate request 312 as described above which may initiate an operation 712 within managed resource 630. Runtime enforcement component 620 may be configured to determine an action 720 (or actions) associated with identified operation 712. For example, managed resource 630 may be configured to perform various actions and may trigger various actions based on operation 712. Action 720 may be determined in various ways. In some embodiments, runtime enforcement component 620 may access functionality descriptor information, which may at least partially indicate which action or actions may be triggered based on a requested operation. Accordingly, determining action 720 may include analyzing identified operation 712.

In some embodiments, action 720 may further be identified using various contextual data 710. This contextual data may be similar to the various contextual information described above and may be any form of information associated with request 312. For example, contextual data 710 may include information such as a user identity, a role, an environment, an active task, a model chain step, a tool name and version, document labels, a time, a geofence, a device posture, a workload attestation, or various other information. Accordingly, runtime enforcement component 620 may be configured analyze contextual data 710 associated with operation 712.

Based on action 720, runtime enforcement component 620 may evaluate one or more access policies associated with managed resource 630. For example, runtime enforcement component 620 may evaluate policy 730, as indicated in FIG. 7. Consistent with the disclosed embodiments, policy 730 may be accessed via policy engine 640, as described above. Through evaluating policy 730, runtime enforcement component 620 may determine one or more enforcement rules for operation 712. In other words, runtime enforcement component 620 may determine whether the identified action is allowed in context of operation 712 based on policy 730. For example, operation 712 may be a "remove:user" operation to remove a particular user from a database. Policy 730 may define that a remove:user operation is not authorized to perform action 720, either directly or through any chain of steps. Accordingly, runtime enforcement component 620 may determine an enforcement rule forbidding operation 712 to perform action 720.

Consistent with the disclosed embodiments, runtime enforcement component 620 may evaluate policy 730 on a per-operation, just-in-time basis. Accordingly, each operation may be analyzed to determine whether it would trigger any actions that potentially violate any rules associated with policy 730. In this way, runtime enforcement component 620 may be configured to determine which syscalls are allowed to be executed based on the action, not based on a process as a whole. For example, there may be multiple actions running concurrently inside a process and runtime enforcement component 620 may be able to isolate which calls within the process are permitted, per action.

In some embodiments, evaluating policy 730 may further be based on contextual data 710. For example, runtime enforcement component 620 may consider various attributes, such as a user identity, role, environment, active task, model chain step, tool name and version, document labels, time, geofence, device posture, workload attestation, or various other information, which may define whether a particular rule would apply. As one example, runtime enforcement component 620 may consider a model chain step. For example, a requested operation may correspond to a single stage in a multi-step execution pipeline where an agentic AI system (like MCP or a similar orchestrator) chains together multiple tools, models, or reasoning stages. In such cases, runtime enforcement component 620 may be configured to determine enforcement rules for each model chain step independently. Runtime enforcement component 620 may further be configured to bind one or more enforcement rules and one or more audit records to a specific model chain step. For example, this may include binding one or more of an entity invoking the step, the purpose of the step, and resources permitted for the step to the particular model chain step. These logs and audit trails can attribute risky actions precisely to the step that requested them, rather than just the overall session.

Consistent with the present disclosure, runtime enforcement component 620 may further enforce the determined rule through an enforcement action 740. In some embodiments, enforcement action 740 may include preventing a particular action from being executed. Alternatively or additionally, enforcement action 740 may include allowing action 720 with certain restrictions. For example, enforcement action 740 may include restricting access to at least one of a file or a directory, based on the enforcement rules. As additional examples, enforcement action 740 may include applying a quota limiting the amount of resources used by the operation, a timeout limiting the duration of the operation, a rate limit restricting the frequency of operations, or similar limitations or restrictions. In some embodiments, enforcement action 740 may include requesting confirmation before resuming execution. For example, this may include requesting confirmation from a user (e.g., identity 112), an administrator, or various other entities prior to enabling an operation. In some embodiments, runtime enforcement component 620 may further be configured to log and/or audit various operations and actions designated by the managed resource as part of the enforcement rules.

FIG. 8 is a flowchart showing an example process 800 for context-aware per-operation enforcement in a managed resource, consistent with the disclosed embodiments. Process 800 may be performed by at least one processor of a server, such as processor 230 described above. In some embodiments, a non-transitory computer readable medium may contain instructions that when executed by a processor cause the processor to perform process 800. Further, process 800 is not necessarily limited to the steps shown in FIG. 8, and any steps or processes of the various embodiments described throughout the present disclosure may also be included in process 800, including those described with respect to, for example, FIGS. 3, 4, 5, 6, 7, 9, or 10.

In step 810, process 800 may include identifying an operation initiated by an autonomous component using a managed resource. For example, step 810 may include identifying operation 712, which may have been initiated by AI agent 610 using managed resource 630, or by a human identity. Consistent with the disclosed embodiments, step 810 (along with any other steps of 800) may be performed by a runtime enforcement component coupled to the managed resource. For example, step 810 may be performed by runtime enforcement component 620. In some embodiments, the runtime enforcement component may comprise a user-space interceptor and an operating system control configured to mediate one or more system calls. For example, mediating the one or more system calls may comprise filtering the system calls based on at least one action selected from: open, connect, clone, unshare, mount, bpf, ptrace, keyctl, io_uring_register, fanotify_init, and perf_event_open. In some embodiments, step 810 may be performed by an interceptor coupled to a managed resource environment.

In step 820, process 800 may include dynamically determining one or more actions designated by the managed resource and contextual data. For example, step 820 may include dynamically determining action 720 (and various other actions) based on operation 712 and contextual information 710. As described above, the designated action and the contextual data may be associated with the operation. Consistent with the disclosed embodiments, determining the one or more actions may be based on analyzing the operation and/or the contextual data. In some embodiments, step 820 may be performed using an analysis component.

In step 830, process 800 may include evaluating one or more access policies to identify one or more enforcement rules for the operation. For example, step 830 may include evaluating policy 730, as described above. In some embodiments, step 830 may be performed just in time based on step 820. In other words, step 830 may be performed per-operation as each action is determined. In some embodiments, step 830 may include applying one or more operational constraints to the operation, which may be defined by the one or more access policies. For example, these constraints may include a quota limiting the amount of resources used by the operation, a timeout limiting the duration of the operation, a rate limit restricting the frequency of operations, or various other constraints. In some embodiments, step 830 may include restricting access to at least one of a file or a directory based on the enforcement rules. In other examples, step 830 may include pausing an operation classified as risky or requesting confirmation before resuming execution. In some embodiments, step 830 may further include logging and/or auditing operations and actions designated by the managed resource as part of the enforcement rules.

In some embodiments, step 830 may include evaluating access policies based on various attribute information that may be available. For example, this may include attributes such as a user identity, a role, an environment, an active task, a model chain step, a tool name and version, document labels, a time, a geofence, a device posture, a workload attestation, or any other relevant attributes. In the example of a model chain step, the model chain step may comprise a discrete stage in a multi-step execution pipeline of the managed resource. Step 830 may include determining enforcement rules for each model chain step independently. Process 800 may further include binding one or more enforcement rules and one or more audit records to a specific model chain step. For example, this may include binding one or more enforcement rules to the context of the model chain step, including one or more of an entity invoking the step, the purpose of the step, and resources permitted for the step. In some embodiments, step 830 may be performed by an evaluation component. For example, the evaluation component may comprise a local policy engine configured to perform policy evaluations in-line.

In step 840, process 800 may include enforcing, during execution of the operation, the one or more enforcement rules. For example, step 840 may include causing enforcement action 740, as described above. In some embodiments, enforcement of the one or more rules may be based on analysis of contextual data, as indicated above. Consistent with the disclosed embodiments, the enforcement rules may be associated with one or more permitted capabilities.

In some embodiments, step 840 may be performed using an enforcement component. For example, the enforcement component may be configured to enforce the one or more enforcement rules using at least one of an in-process enforcement mechanism and an out-of-process enforcement mechanism. As another example, the enforcement component may be configured to enforce the one or more enforcement rules based on utilizing at least one of a kernel-level policy enforcement point and a user-space policy enforcement point.

As explained above, the disclosed techniques may provide dynamic purpose-based authorization for artificial intelligence agents. For example, authorization component 310 may be configured to issue authorization artifact 440 based on tailored policy information 430, as described with respect to FIG. 4. Authorization component 320 may be configured to monitor operations of AI agent 310 (and/or AI agent 610) at various other points or "gateways" for purposes of authorizing an operation. This may include comparing data used or exchanged by AI agent 310 at various stages with expected actions or planned actions.

Figure 9:
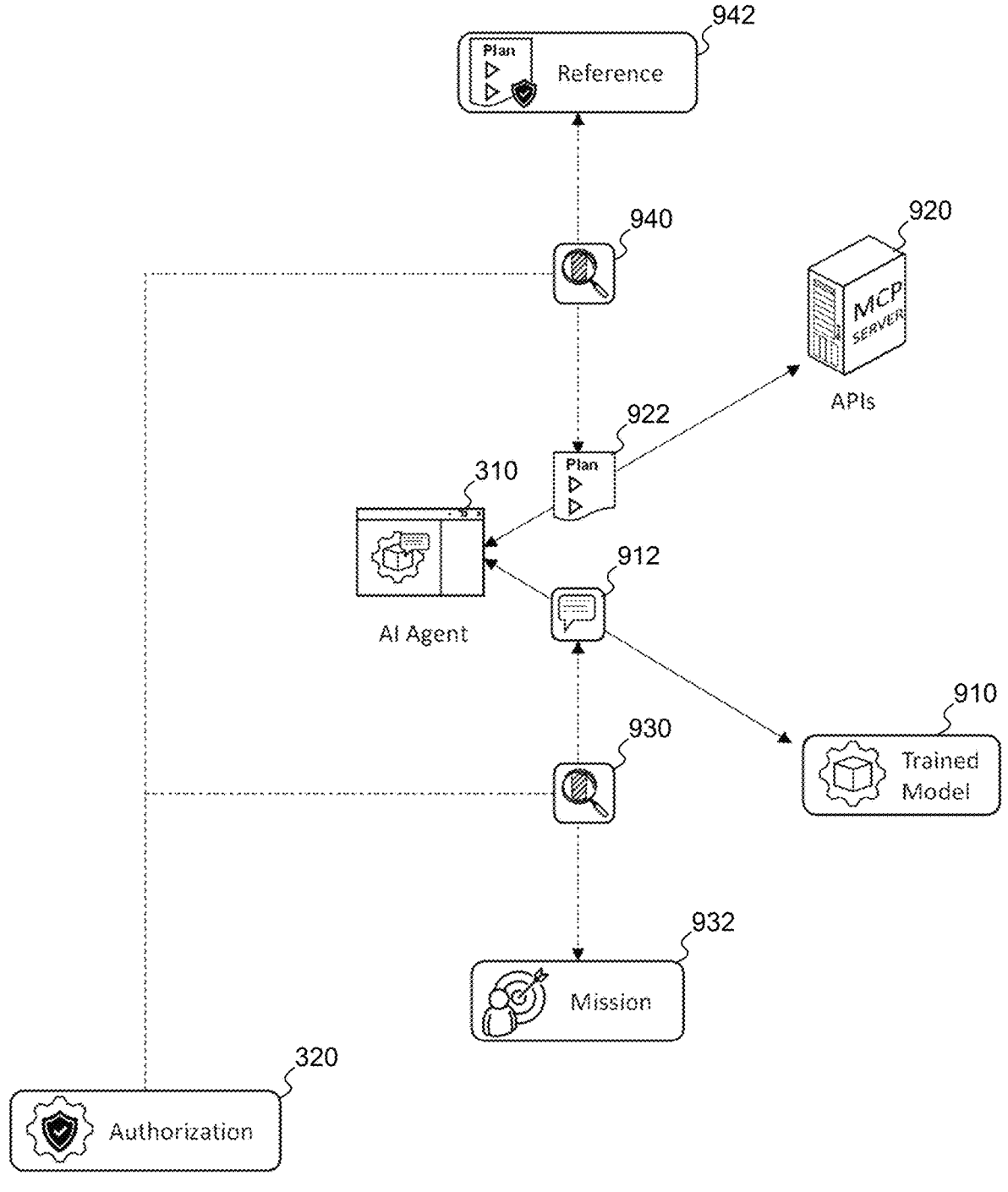
FIG. 9 is a block diagram illustrating additional analysis that may be performed using an authorization component for validating an operation, consistent with the disclosed embodiments.

FIG. 9 is a block diagram illustrating additional analysis that may be performed using authorization component 320 for validating an operation, consistent with the disclosed embodiments. As explained with respect to FIG. 3, AI agent 310 may perform various operations using an orchestration system 330. For example, this may include generating request 312, which may result in an operation performed at or otherwise in association with target resource 130. In some embodiments, AI agent 310 may perform various other tasks in generating request 312. For example, AI agent 310 may be configured to access one or more trained models to carry out various tasks requested by identity 112. For example, based on a request received from identity 112, AI agent 310 may generate an input 912 to a trained model 910, as shown in FIG. 9. Input 912 may include any form of request or prompt to a trained model in furtherance of an operation.

As one example, trained model 910 may be an LLM configured to generate an execution plan for carrying out a requested operation. For example, as described above AI agent 310 may use a dedicated LLM interaction library, such as LangChain™, LangGraph™ Haystack™, LlamaIndex™, or similar libraries. Trained model 910 may generate an execution plan 922, which may represent a list of steps or actions to be performed by AI agent 310 to accomplish an operation requested by identity 112. Accordingly, input 912 may be a model prompt requesting a set of actions to be performed at external system 920 in furtherance of the requested operation. In response, execution plan 922 may be provided as an output of trained model 910 to AI agent 310. For example, execution plan 922 may represent a series of API calls for AI agent 310 to submit to external system 920. Consistent with the disclosed embodiments, external system 920 may be an MCP server used by AI agent 310 to carry out at least a portion of an operation. According to some embodiments, execution plan 922 may not necessarily be output directly from trained model 910 and may be further developed by AI agent 310. Accordingly, AI agent 310 may at least partially develop execution plan 922 using information provided by trained model 910. While an LLM and MCP server are provided by way of example, it is to be understood that the disclosed techniques may be implemented with a wide variety of trained models and/or external systems.

As described above, authorization component 320 may be configured to determine a minimal set of permissions required for performing the operation and may generate ephemeral permissions accordingly (or may generate an authorization artifact that embeds an ephemeral permission set scoped to the least-privileged permissions, as described above). In some embodiments, authorization component 320 may perform various other validation techniques associated with the operations shown in FIG. 9. For example, authorization component 320 may be configured to perform a monitoring 930 associated with input 912. Monitoring 930 may represent a first "gateway" through which actions of AI agent 310 may be evaluated. Authorization component 320 may be configured to compare input 912 to a mission 932, as shown in FIG. 9. As used herein, a "mission" may refer to an overall purpose or goal that has been defined in association with system 300. In some embodiments, mission 932 may be associated with identity 112, such as a role or purpose associated with identity 112. For example, mission 932 may be associated with a title, role, organizational membership, or other attributes of identity 122. As another example, mission 932 may be tied to various connection metadata or other forms of data that may at least partially identify identity 112, such as an IP address, location, time, date, day of the week, etc. In some embodiments, mission 932 may be associated with a particular resource, such as target resource 130. For example, the target resource may be a webpage (i.e., "booking.com") and mission 932 may pre-define that in booking through this resource AI agent 310 may only rent cars, hotels, or flights, and not cruises or activities.

In some embodiments, mission 932 may be stored in an unstructured format, such as unstructured text or natural language data. For example, mission 932 may be a description explaining that identity 112 may have read-only access to medical records data, or may write to medical records associated with identity 112. As other examples, mission 932 may be an explanation of a role, such as booking travel, downloading employee data, etc. Thus, any requested actions that depart from these roles may be flagged. Alternatively or additionally, mission 932 may be represented as structured text, representing a collection of principles, actions, and resources. In some embodiments, this may be a list or other structure of allowed attributes. Alternatively, the list may be presented in a negative format, such as attributes that are not allowed and should be denied. In some embodiments, mission 932 may represent a list of constraints based on, for example, time, requests headers, content-type, network connection metadata, or the like.

In some embodiments, mission 932 may be predefined within the system, for example, by an administrator or other user. In some embodiments, mission 932 may be extracted from various sources within the system. For example, if identity 112 is associated with an organization, mission 932 may be extracted from a database associated with the organization, a webpage associated with the organization, from external sources, such as LinkedIn™, or the like.

In some embodiments, mission 932 may be learned by authorization component 320 or other components. For example, this may include clustering past actions, principles, resources and/or context parameters to generate and/or update mission 932. In some embodiments, mission 932 may be generated using a trained machine learning model, such as a k-means algorithm, a DBSCAN clustering algorithm, or the like. In some embodiments, the machine learning model may be an LLM configured to aggregate historical actions to develop mission 932. For example, the LLM may access historical data associated with identity 112, target resource 130, or various other entities and may generate a description of a mission for the entity based on this historical use.

As another example, mission 932 may be represented as a workflow or chain of identities defined as a Directed Acyclic Graph (DAG). For example, mission 932 may be configured to allow a user from a "medical admin" role when using an AI Agent having an individual identifier (e.g., agent1234) or group identifier (e.g., "Claude™ AI Agents"). As another example, mission 932 may be configured to allow a particular user (e.g., with a name identifier "John.Smith") to access medical records read-only via a particular agent. Various other rules may be defined, for example, based on a session identifier (e.g., a specified volume of actions per session, an order of actions, time between actions, etc.), previous activity logs, a state or status of other machines in the environment, a state or status of other identities in the environment, security audits or other security information, or the like.

Monitoring 930 may verify whether input 912 from AI agent 310 is consistent with mission 932. For example, if mission 932 is a job description indicating identity 112 is an administrative assistant and frequently books travel reservations, and input 912 is associated with booking a flight, authorization component 320 may determine that input 912 is valid. On the other hand, if input 912 is associated with requesting a series of steps for accessing a social security number or other sensitive information for an employee, input 912 may be determined to deviate from this mission.

Monitoring 930 may evaluate input 912 relative to mission 932 in various ways. In some embodiments, mission 932 may include generating a distance metric of input 912 relative to mission 932. As used herein, this distance metric may be any value or description indicating a degree to which input 912 is consistent with mission 932. For example, the distance metric may be a score (e.g., as a percentage, a number within a range, etc.) rating the degree to which input 912 is consistent with mission 932. For example, a score of 90% may represent a relatively high degree of correspondence. As another example, the distance metric may be a text-based rating, such as "high," "medium," or "low." In other embodiments, the distance metric may be a binary value, such as "allowed" or "disallowed."

Based on monitoring 930, authorization component 320 may determine whether to validate input 912. If input 912 is validated, authorization component 320 may allow AI agent 310 to proceed. Otherwise, authorization component 320 may perform various control actions, such as blocking the requested operation. For example, where a distance metric is determined, this may include comparing the distance metric to a threshold distance metric value. For example, authorization component 320 may be configured to reject any input 912 (or perform various other control actions) for any distance metrics below 60% (or any other suitable value). In some embodiments, different control actions may be defined for different thresholds. For example, a first threshold may be defined for flagging an operation to an administrator (while still allowing it to proceed), whereas a second threshold may be defined for blocking the requested operation (which may also include flagging it).

In some embodiments, the threshold may be a predefined value, for example, specified by an administrator. Alternatively or additionally, the threshold may be dynamically assigned. For example, authorization component 320 (or other components) may be configured to learn appropriate distance metrics over time and adjust them accordingly. In some embodiments, this may be based on feedback from an administrator or other user. For example, if the system flags or block inputs and an administrator manually allows them, the system may adjust the threshold to account for this manual input.

Consistent with the disclosed embodiments, at least a portion of monitoring 930 may be performed using a machine learning model, which may be the same or different from the machine learning model used to generate mission 932 and/or various other machine learning models described herein. For example, authorization component 320 may be configured to provide input 912 and mission 932 into an LLM to analyze the degree to which input 912 is consistent with mission 932. Based on an output from this LLM, authorization component 320 may determine whether to allow or deny the operation. In some embodiments, the trained model may output a distance metric, which authorization component 320 may use to validate input 912. Alternatively or additionally, the trained model may generate the validation result without an intermediate distance metric value.

In some embodiments, authorization component 320 may be configured to perform a monitoring 940 associated with execution plan 922 as a second "gateway." Monitoring 940 may be in addition to monitoring 930 or may be performed as an alternative form of monitoring. As explained above, based on an output of trained model 910, AI agent 310 may develop execution plan 922, which it may use for accessing external system 920. Execution plan 922 may represent a series of actions (e.g., API calls) to be performed at external system 920. Through monitoring 940, authorization component 320 may evaluate this execution plan 922 against a reference execution plan 942. Reference execution plan 942 may represent an expected series of steps required to carry out a desired operation indicated by input 912. Accordingly, even where input 912 matches an intended mission for identity 112, AI agent 310, target resource 130, or various other components, a control action may be performed if the steps for carrying out an operation deviate from expected steps for carrying out the operation. This may enable authorization component 320 to detect instances where the actions of AI agent 310 are invalid, either inadvertently (e.g., through some form of error) or intentionally (e.g., based on a malicious injection, etc.), even where the operation itself aligns with mission 932.

Similar to execution plan 922, reference execution plan 942 may include a series of expected steps or actions that may compared to steps within execution plan 922. Reference execution plan 942 may be identified in various ways. In some embodiments, reference execution plan 942 may be a stored plan used to validate requested actions. For example, reference execution plan 942 may be a predefined execution plan associated with system 300. In some embodiments, reference execution plan 942 may be identified based on a type of input 912. For example, authorization component 320 may access a database (or other data structure) associating reference execution plan 942 with a type of input, with a mission, or various other information described herein. Accordingly, monitoring 940 may include determining a type or other classification associated with input 912 and accessing reference execution plan 942 based on the identified classification. Alternatively or additionally, authorization component 320 may determine a type or other classification of execution plan 922, which may be used to identify reference execution plan 942. In some embodiments, monitoring 940 may include comparing multiple reference execution plans to execution plan 922. For example, authorization component 320 (or another component) may determine that execution plan 922 corresponds to steps from multiple reference execution plans and thus may compare execution plan 922 to multiple reference execution plans.

Similar to monitoring 930, monitoring 940 may include generating a distance metric, which may be any value or description indicating a degree to which execution plan 922 is consistent with reference execution plan 942. For example, this distance metric may be a score, a text-based rating, a binary value, or various other formats, similar to the distance metric for monitoring 940. Based on monitoring 940, authorization component 320 may also determine whether to validate execution plan 922. If validated, authorization component 320 may allow AI agent 310 to proceed. Otherwise, authorization component 320 may perform various control actions, such as blocking the requested operation. For example, where the distance metric is determined, this may include comparing the distance metric to a threshold distance metric value, as described above.

The comparison in monitoring 940 may take into account a wide variety of parameters to determine the degree to which execution plan 922 corresponds to reference execution plan 942. For example, where each execution plan includes multiple steps, monitoring 940 may include comparing each of the steps in execution plan 922 to one or more steps in reference execution plan 942. Alternatively or additionally, the comparison may be based on an overall determination of whether the overall flow of steps is consistent with the steps in reference execution plan 942, including the order of actions. In some embodiments, a more detailed analysis may be performed by examining parameters or values associated with one or more of the steps. As one example, execution plan 922 may include a step of purchasing a flight, which may correspond to a similar step in reference execution plan 942. However, if a price of a flight, a destination of the flight, a number of layovers associated with the flight, or various other details vary from similar values in reference execution plan 942, this may trigger a warning or other control action. While a flight booking is provided by way of example, one of ordinary skill would recognize that this would apply to any form of parameters associated with a requested operation.

In some embodiments, monitoring 940 may include generating reference execution plan 932. For example, authorization component 320 may include a separate trained model, similar to trained model 910, which may be configured to generate its own execution plan based on input 912 (i.e., reference execution plan 942). Accordingly, monitoring 940 may include inputting input 912 into an additional trained model to generate reference execution plan 942. This additional trained model may thus act as a trusted model used to verify the output of trained model 910. In some embodiments, multiple additional models may be used. For example, monitoring 940 may include generating multiple reference execution plans, each associated with a different trusted model, and monitoring 940 may include comparing execution plan 922 to each of these reference execution plans. Accordingly, a distance metric associated with monitoring 940 may be a composite metric based on comparisons to multiple reference execution plans 932.

As with monitoring 930, monitoring 940 may cause a control action to be performed. In some embodiments, the control actions based on monitoring 930 and monitoring 940 may be different. For example, authorization component 320 may perform a first control action based on a first validation associated with monitoring 930 and a second control action based on a second validation associated with monitoring 940. In some embodiments, the control action selected may be determined based on various factors, such as the distance metric (e.g., the degree to which input 912 or execution plan 922 varies from mission 932 or reference execution plan 942, respectively), a type of operation (e.g., whether it is a sensitive operation or not), which target resource is impacted, which AI agent is implemented, which identity is associated with the request, or the like. As explained above, one or both of monitoring 930 and monitoring 940 may be performed in addition to generating authorization artifact 440. For example, monitoring 930 and monitoring 940 may be performed as an additional layer of security for the techniques described above. Alternatively, one or both of monitoring 930 and monitoring 940 may be performed without generating authorization artifact 440.

While the same authorization component 320 is shown to perform monitoring 930, monitoring 940, and process 400, it is to be understood that any of these techniques may be performed by separate components or various combinations thereof. Further, authorization component 320 (or the component(s) performing monitoring 930, monitoring 940, and process 400) may not necessarily be on orchestration system 330. For example, authorization component 320 may be a network component and may be configured to perform various tasks over network 150. Alternatively or additionally, authorization component 320 may be a component of client device 110, such as an operating system tool, or the like.

FIG. 10 is a flowchart showing an example process 1000 for controlling access to a resource by an artificial intelligence orchestration system, consistent with the disclosed embodiments. Process 1000 may be performed by at least one processor, such as processor 230 described above. In some embodiments, a non-transitory computer readable medium may contain instructions that when executed by a processor cause the processor to perform process 1000. Further, process 1000 is not necessarily limited to the steps shown in FIG. 10, and any steps or processes of the various embodiments described throughout the present disclosure may also be included in process 1000, including those described with respect to, for example, FIGS. 3, 4, 5, 6, 7, 8, or 9.

In step 1010, process 1000 may include identifying a request to perform an operation, the request being initiated by an entity. The request may be identified using an authorization component integrated with an orchestration system. For example, step 1010 may include identifying request 312, at authorization component 320, as described above.

In step 1020, process 1000 may include identifying an input to a machine learning model associated with the request. For example, step 1020 may include identifying input 912 to trained model 910, as described above. Accordingly, the input may be an input by an AI agent to a trained model.

In step 1030, process 1000 may include dynamically evaluating the input to determine a first distance metric of the input relative to a mission associated with the operation. For example, step 1030 may correspond to monitoring 930, which may be based on a comparison of input 912 to mission 932, as described above. In some embodiments, the first distance metric may be determined using at least one additional trained model.

In step 1040, process 1000 may include performing a first validation of the operation based on the first metric. For example, step 1040 may include validating the operation based on input 912, as described above. In some embodiments, the first validation may include comparing the first distance metric to a threshold distance metric. Consistent with the disclosed embodiments, the threshold distance metric may be dynamically assigned by the authorization component. For example, authorization component 320 may dynamically adjust the threshold distance metric based on various factors. In some embodiments, the threshold distance metric may be configured based on an input from a user. For example, an administrator or other user may at least partially define the distance metric. In some embodiments, performing the first validation of the operation based on the first metric may include applying at least one additional machine-learning model, as described above.

In step 1050, process 1000 may include identifying an execution plan associated with the operation. For example, step 1050 may include identifying execution plan 922, as described above. The execution plan may have been generated using the machine learning model. For example, the execution plan may be generated based on input 912 using trained model 910. In some embodiments, the execution plan may be generated by a machine learning component based on an output of the machine learning model. In other words, additional processing may be performed on the output of trained model 910 to generate execution plan 922.

In step 1060, process 1000 may include identifying a reference execution plan associated with the operation. For example, step 1060 may include identifying reference execution plan 942. In some embodiments, identifying the reference execution plan associated with the operation may include generating the reference execution plan. As described above, the reference execution plan may be generated using at least one additional machine-learning model.

In step 1070, process 1000 may include dynamically evaluating the execution plan to determine a second distance metric of the execution plan relative to the reference execution plan. Step 1070 may correspond to monitoring 940 described above. As explained, the reference execution plan may include one or more expected operations associated with the input. Accordingly, the second distance metric of the operation relative to the reference execution plan may be based on a comparison of the execution plan to the one or more expected operations.

In step 1080, process 1000 may include performing a second validation of the operation based on the second distance metric. In some embodiments, the second validation may include comparing the second distance metric to a threshold distance metric. As with the first validation, the threshold distance metric may be dynamically assigned by the authorization component. For example, authorization component 320 may dynamically adjust the threshold distance metric based on various factors. In some embodiments, the threshold distance metric may configured based on an input from a user. For example, an administrator or other user may at least partially define the distance metric. In some embodiments, performing the second validation of the operation based on the second metric may include applying at least one additional machine-learning model, as described above.

In some embodiments, the second validation may include initiating a human approval workflow for an action. For example, the second validation may include generating at least one prompt requesting input from a user, such as identity 112, an administrator, or the like. The at least one prompt may be generated based on a comparison of the second distance metric to the threshold distance metric. For example, if the distance metric indicates a specified degree of deviation from the reference execution plan, this may trigger user input. In some embodiments, the user input may be an explanation of what task is being performed, why a certain value differs from an expected value, whether this operation is normal or routine (e.g., for adjusting the threshold), or any other information that may assist authorization component 320 for this or future validations. In some embodiments, initiating a human approval workflow may include modeling approval by at least one of a human approver or a non-human system component. For example, as described above, a human approver may delegate various decisions to an AI agent. In some embodiments, an automated approval may be learned based on past human approvals. For example, a training set of data based on human approvals may be input into a machine learning algorithm to generate an automated approval model. The model may also be reinforced through human inputs, for example, by tagging automatic decisions as good or bad to improve the model.

In some embodiments, identifying the reference execution plan may include identifying a plurality of reference execution plans, as described above. Accordingly, the second validation of the operation may be performed based on a plurality of second distance metrics of the execution plan relative to the plurality of reference execution plans. For example, the validation may include determining whether any of the plurality of second distance metrics includes an anomaly, performing a statistical analysis of the second distance metrics (e.g., an average, a minimum, a maximum, etc.), or the like. In some embodiments, the reference execution plan may be evaluated against a history of reference plans associated with similar LLM inputs. Accordingly, dynamically evaluating the execution plan to determine a second distance metric of the execution plan relative to the reference execution plan may include evaluating a plurality of outcomes of previous execution plans associated with the operation.

Further, in some embodiments, multiple evaluations may be performed using different models, which may then be cross examined against each other to validate an operation. For example a first model may generate a first distance metric, which may be based on a single or multiple reference execution plans. A second model may then perform the same or similar evaluation to generate a second distance metric. This may be repeated with additional models as well. The determination of whether the execution plan is valid may be based on a combination of these distance metrics. For example, this may include a minimum distance metric, an average distance metric, or various other statistical evaluations. In some embodiments, each model may determine whether the execution plan is valid and a final determination may be based on how many of the models validate the execution plan (e.g., if all models validate the execution plan, or some threshold percentage thereof).

It is to be understood that while various operations may be described relative to the first validation or the second validation, they may equally apply to the other validation. For example, process 1000 may similarly include requesting input from a user based on comparing the first distance metric to a threshold. As described above, at least one of the first distance metric or the second distance metric may be based on temporal features of a session. For example, this may include an action order, a time interval between actions, or any other time- or sequence-based relationships among the actions. In some embodiments, at least one of the mission associated with the autonomous component or the execution plan may further represent a context of the operation.

As described above, authorization component 320 may perform various control actions based on monitoring 930 and/or monitoring 940. Accordingly, process 1000 may further include performing, based on a determination that the operation is invalid in either of the first validation or the second validation, at least one control action. The control action may include at least one of blocking the operation, terminating a session, or generating an alert.

As explained, process 1000 may be performed in place of or in combination with the various other techniques described herein, including process 500. Accordingly, process 1000 may further include identifying one or more least-privileged permissions required for the operation; issuing, based on a determination that the operation is valid in each of the first validation and the second validation, an authorization artifact that embeds an ephemeral permission set scoped to the least-privileged permissions; and enabling the operation to execute using the ephemeral permission set. The authorization artifact may further encode at least one of: a session identifier, a prompt digest, or a reasoning plan identifier.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways. For example, the various processes disclosed herein may not necessarily include all steps or may not necessarily be performed in the order shown in the accompanying figures.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for controlling access to a resource by an artificial intelligence orchestration system, the operations comprising:

receiving, at an authorization component integrated with the orchestration system, a request to perform an operation, the request being initiated by an autonomous component;

deriving, from the request and data associated with an environmental state, information representing at least one of a purpose and a context of the operation;

dynamically evaluating the information to identify one or more least-privileged permissions required for the operation;

issuing an authorization artifact that embeds an ephemeral permission set scoped to the least-privileged permissions; and enabling the operation to execute using the ephemeral permission set.

2. The non-transitory computer readable medium of claim 1, wherein deriving the information representing the purpose comprises applying at least one machine-learning model.

3. The non-transitory computer readable medium of claim 1, wherein the context of the operation comprises one or more attributes selected from: an input to a machine learning model associated with the request, metadata associated with the autonomous component, an identity of a user associated with the autonomous component, a role of a user associated with the autonomous component, an identifier of a tool associated with the orchestration system, a model chain step, an identifier associated with a target resource, a data classification, a time, a location, a device posture, a historical operation, past operations performed by the autonomous components, past operations performed by an identity associated with a user associated with the autonomous components, and a workload attestation.

4. The non-transitory computer readable medium of claim 1, wherein the authorization artifact encodes at least one of a time limit, a usage count, or a signature that binds at least one of a purpose, a scope, an expiry, a session identifier, a prompt digest, or a reasoning plan identifier.

5. The non-transitory computer readable medium of claim 1, wherein evaluating the information further comprises initiating a human approval workflow for an action.

6. The non-transitory computer readable medium of claim 1, wherein causing the operation to execute comprises constraining at least one of: a prompt scope, a target selection, or an environment configuration.

7. The non-transitory computer readable medium of claim 1, wherein causing the operation to execute comprises provisioning a temporary credential that embodies the ephemeral permission set.

8. The non-transitory computer readable medium of claim 1, wherein the operations further comprise invalidating the authorization artifact upon completion of the operation or upon satisfaction of a revocation condition.

9. The non-transitory computer readable medium of claim 8, wherein invalidating the authorization artifact comprises revoking a temporary credential and clearing secret material from memory.

10. The non-transitory computer readable medium of claim 1, wherein the operations further comprise recording one or more audit records associated with the operation.

11. The non-transitory computer readable medium of claim 10, wherein recording the audit comprises binding the operation to at least one of a workflow identifier or a step identifier, and wherein the authorization component operates as a proxy or wrapper for an agentic artificial intelligence tool framework.

12. The non-transitory computer readable medium of claim 1, wherein the evaluating further includes analyzing one or more rules pre-defined by an entity associated with a customer.

13. The non-transitory computer readable medium of claim 1, wherein evaluating the information comprises utilizing a policy engine coupled to the orchestration system.

14. The non-transitory computer readable medium of claim 1, wherein evaluating the information comprises applying at least one machine-learning model.

15. The non-transitory computer readable medium of claim 1, wherein the information represents a context of the operation and wherein deriving the information comprises obtaining attributes selected from: a user identity, a user role, historical requests of the user, a running environment, an active task associated with the operation, a name and version of a tool associated with the orchestration system, document labels, a time, a geofence, a device posture, past operations performed by the autonomous component, past operations performed by an identity of a user associated with the autonomous components, and a workload attestation.

16. The non-transitory computer readable medium of claim 1, wherein the authorization artifact encodes a purpose binding comprising at least one of: a workflow identifier, a step identifier, a data classification, or a requested scope, and wherein the evaluation requires the purpose to match a permitted value.

17. The non-transitory computer readable medium of claim 1, wherein the operations further comprise:

identifying an input to a machine learning model associated with the request;

dynamically evaluating the input to determine a first distance metric of the input relative to a mission associated with the autonomous component; and performing a first validation of the operation based on the first metric.

18. The non-transitory computer readable medium of claim 1, wherein the operations further comprise:

identifying an execution plan associated with the operation, the execution plan being generated using a machine learning component;

identifying at least one reference execution plan associated with the operation;

dynamically evaluating the execution plan to determine a second distance metric of the execution plan relative to the at least one reference execution plan; and performing a second validation of the operation based on the second distance metric.

19. A computer-implemented method for controlling access to a resource by an artificial intelligence orchestration system, the method comprising:

receiving, at an authorization component integrated with the orchestration system, a request to perform an operation, the request being initiated by an autonomous component;

deriving, from the request and data associated with an environmental state, information representing at least one of a purpose and a context of the operation;

dynamically evaluating the information, to identify one or more least-privileged permissions required for the operation;

issuing an authorization artifact that embeds an ephemeral permission set scoped to the least-privileged permissions; and causing the operation to execute using the ephemeral permission set.

20. The method of claim 19, wherein at least one of deriving the information or dynamically evaluating the information comprises applying at least one machine-learning model.

21. The method of claim 20, wherein the model incorporates historical interaction data associated with an initiator of the operation.

22. The method of claim 19, wherein the authorization artifact further embeds at least one of an indication of the request to perform an operation or a sequence of actions associated with causing the operation to execute.

23. A non-transitory computer readable medium including instructions that, when executed by at least one processor, cause the at least one processor to perform operations for controlling access to a resource by an artificial intelligence orchestration system, the operations comprising:

receiving, at an authorization component integrated with the orchestration system, a request to perform an operation, the request being initiated by an autonomous component;

deriving, from the request and data associated with an environmental state, information representing at least one of a purpose and a context of the operation;

dynamically evaluating the information, to identify one or more parameters for adapting the operation;

modifying the request based on the parameters to generate a modified request; and causing the operation to execute the modified request.

* * * * *